US009325376B2

(12) United States Patent
Nosaka et al.

(10) Patent No.: US 9,325,376 B2
(45) Date of Patent: Apr. 26, 2016

(54) DIRECT CURRENT POWER LINE COMMUNICATION SYSTEM AND DIRECT CURRENT POWER LINE COMMUNICATION APPARATUS

(75) Inventors: Shigekiyo Nosaka, Fukuoka (JP); Hisao Koga, Fukuoka (JP); Ryota Yukizane, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 841 days.

(21) Appl. No.: 13/431,299

(22) Filed: Mar. 27, 2012

(65) Prior Publication Data

US 2012/0181878 A1    Jul. 19, 2012

Related U.S. Application Data

(63) Continuation-in-part of application No. PCT/JP2010/005897, filed on Sep. 30, 2010.

(30) Foreign Application Priority Data

Sep. 30, 2009  (JP) ................. 2009-226947
Sep. 30, 2009  (JP) ................. 2009-226948
Sep. 30, 2009  (JP) ................. 2009-226949

(51) Int. Cl.
*H02J 13/00*    (2006.01)
*H04B 3/54*    (2006.01)

(52) U.S. Cl.
CPC ............. *H04B 3/548* (2013.01); *H04B 3/542* (2013.01); *H04B 2203/545* (2013.01); *H04B 2203/5437* (2013.01); *H04B 2203/5445* (2013.01)

(58) Field of Classification Search
CPC .......... H04B 3/542; H04B 2203/5437; H04B 2203/5445; H04B 2203/545; H04B 3/548
See application file for complete search history.

(56) References Cited

U.S. PATENT DOCUMENTS

| 3,659,280 | A | * | 4/1972 | Donohoo ............... 340/538.12 |
| 5,391,932 | A | | 2/1995 | Small et al. |
| 6,714,394 | B1 | | 3/2004 | Kumayasu |
| 2004/0263321 | A1 | * | 12/2004 | Hair et al. ............... 340/310.01 |
| 2005/0086546 | A1 | * | 4/2005 | Darshan et al. ............... 713/300 |

(Continued)

FOREIGN PATENT DOCUMENTS

| JP | 2000-165303 | 6/2000 |
| JP | 2002-057607 | 2/2002 |

(Continued)

OTHER PUBLICATIONS

International Search Report dated Dec. 14, 2010.

(Continued)

*Primary Examiner* — Jared Fureman
*Assistant Examiner* — Joel Barnett
(74) *Attorney, Agent, or Firm* — Seed IP Law Group PLLC

(57) ABSTRACT

Disclosed is a direct current power line communication apparatus, by which communication between electronic apparatuses with a direct current voltage line there between can be stabilized. The direct current power line communication apparatus, i.e., a direct current power line communication apparatus that transmits signals using the direct current voltage line (15a), is provided with: a PLC communication control unit (29), which controls the transmitting unit (27) connected to the direct current voltage line (15a); and a voltage detecting unit (30), which detects the voltage of the direct current voltage line (15a), and notifies the PLC communication control unit (29) of the detected voltage. The PLC communication control unit (29) transmits information, including the voltage information, to other direct current power line communication apparatus via the transmitting unit (27).

24 Claims, 13 Drawing Sheets

(56) References Cited

U.S. PATENT DOCUMENTS

| | | |
|---|---|---|
| 2006/0145535 A1 | 7/2006 | Kaneko |
| 2007/0076676 A1 | 4/2007 | Shiba |
| 2008/0107242 A1* | 5/2008 | Ichihara et al. .............. 379/1.03 |
| 2008/0123302 A1* | 5/2008 | Kawano et al. ............... 361/728 |
| 2010/0237695 A1* | 9/2010 | Covaro et al. ................... 307/19 |

FOREIGN PATENT DOCUMENTS

| | | |
|---|---|---|
| JP | 2002-246964 | 8/2002 |
| JP | 2006-180384 | 7/2006 |
| JP | 2007-306738 | 11/2007 |
| JP | 2007-312046 | 11/2007 |
| JP | 2009-065588 | 3/2009 |
| JP | 2009-178006 A | 8/2009 |
| WO | 95/03654 A1 | 2/1995 |

OTHER PUBLICATIONS

Extended European Search Report dated Mar. 19, 2015, for corresponding EP Application No. 10820157.5-1852/2485405, 7 pages.

* cited by examiner

DIRECT CURRENT POWER LINE COMMUNICATION SYSTEM AND DIRECT CURRENT POWER LINE COMMUNICATION APPARATUS

TECHNICAL FIELD

The present invention relates to a direct current power line communication system and direct current power line communication apparatus.

RELATED ART

As a method of supplying power from a power company to users (homes, factories, stores, and so forth), alternating current power is first supplied from the power company to a pole-mounted transformer and is then stepped down by this pole-mounted transformer, after which the stepped-down alternating current power is supplied to the users (homes, factories, stores, and so forth).

In recent years, it has been proposed that alternating current power supplied to users as described above should be converted to a plurality of direct current voltages with different voltage values by means of user-specific voltage changing apparatus provided on a user-by-user basis, and should be supplied to various electronic devices via direct current voltage lines and power outlets (see Patent Literature 1, for example).

That is to say, the aim is to improve power utilization efficiency by performing direct current drive of electronic devices such as television receivers, personal computers, telephones, and so forth, installed in individual user premises.

In this case, of course, it is necessary for the electronic devices themselves to be changed to direct current drive types so as to be driven by a direct current, but even when electronic devices have been changed in this way, drive voltage values differ for individual electronic devices.

Thus, in order to handle electronic devices with different drive voltages, it is necessary for each user to be provided with a plurality of direct current voltage lines with different supply voltages, and a direct current power line communication system using the above user-specific voltage changing apparatus is constructed.

RELATED ART LIST

Patent Literature

PTL 1
Japanese Patent Application Laid-Open No. 2009-65588

SUMMARY OF INVENTION

The embodiments described below relate to a direct current power line communication apparatus. This direct current power line communication apparatus is supplied with a first direct current voltage, and detects the first direct current voltage. Then the direct current power line communication apparatus reports information on the first direct current voltage to another direct current power line communication apparatus that is supplied with a second direct current voltage of a different value from the first direct current voltage. That is to say, another direct current power line communication apparatus is notified of information on the first direct current voltage supplied to the direct current power line communication apparatus.

Also, the embodiments described below relate to a direct current power line communication system provided with a first direct current power line communication apparatus and a second direct current power line communication apparatus. The first direct current power line communication apparatus is supplied via a first direct current voltage line with a first direct current voltage output by a first output terminal. The second direct current power line communication apparatus is supplied via a second direct current voltage line with a second direct current voltage output by a second output terminal. Then the first direct current power line communication apparatus reports information on the first direct current voltage to the second direct current power line communication apparatus.

DESCRIPTION OF EMBODIMENTS

Now, Embodiments 1 through 5 of the present invention will be described with reference to the accompanying drawings.

Embodiment 1

Figure 1:
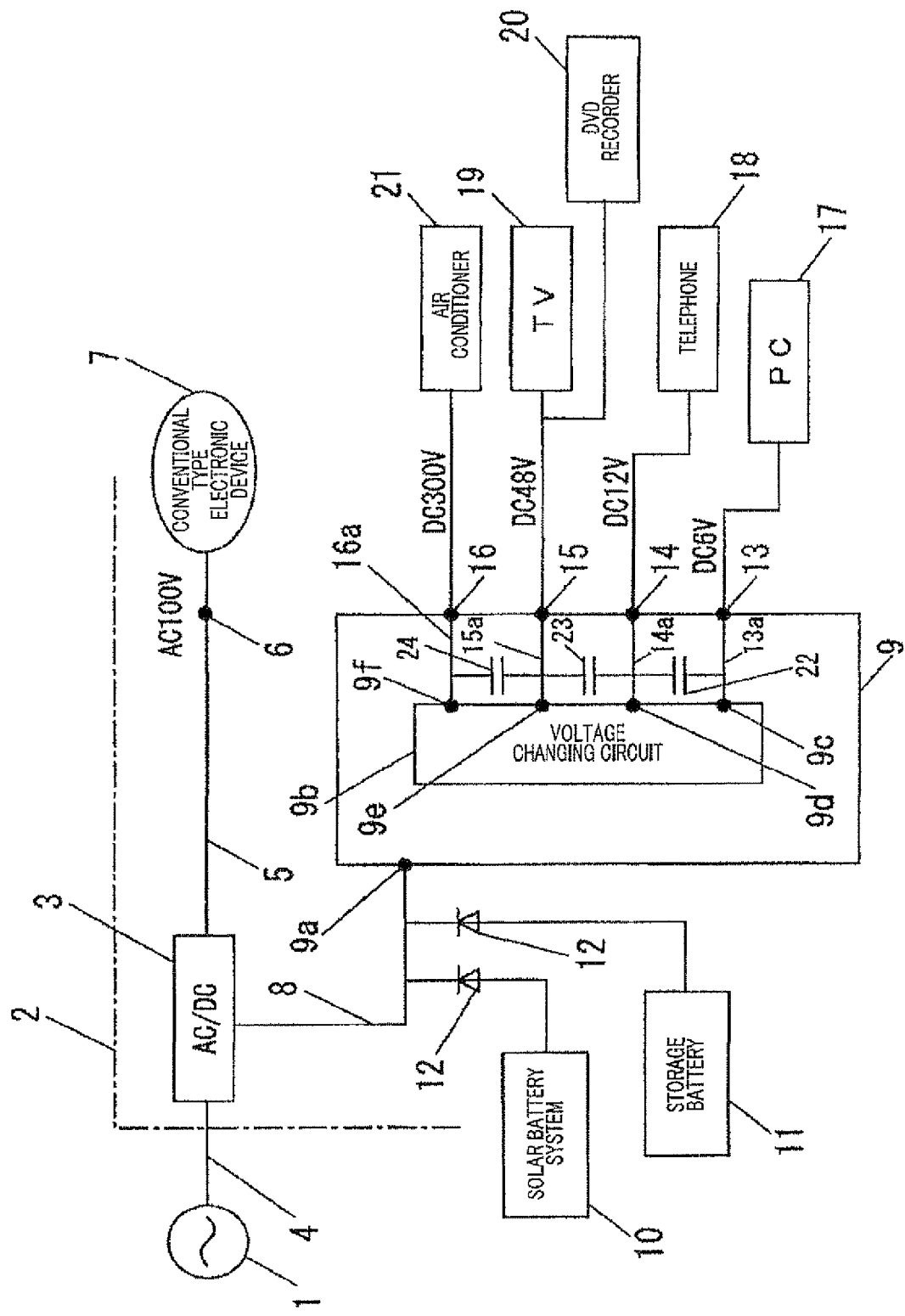
FIG. 1 is a block diagram of a direct current power line communication system according to Embodiment 1.

In FIG. 1, reference code 1 indicates a pole-mounted transformer that steps down an alternating current voltage supplied from a power company (not shown), and this pole-mounted transformer 1 and alternating current-direct current conversion section 3 in individual user premises (home, factory, store, or the like) 2 are connected by direct current voltage line 4.

100 V alternating current supplied to alternating current-direct current conversion section 3 from pole-mounted transformer 1 is branched internally, with one branch passing through alternating current-direct current conversion section 3 and being supplied to power outlet 6 from direct current voltage line 5.

A currently commonly used alternating current drive type electronic device 7 is connected to this power outlet 6.

The other current branched by alternating current-direct current conversion section 3 is converted to a 48 V direct current, for example, and is supplied to user-specific voltage changing apparatus 9 via direct current voltage line 8.

Direct current generation section 10 such as a solar battery system and direct current storage section 11 such as a storage battery, for example, are connected between alternating current-direct current conversion section 3 and user-specific voltage changing apparatus 9 via respective diodes 12.

User-specific voltage changing apparatus 9 is for generating DC (direct current) 6 V, DC 12 V, DC 48 V, and DC 300 V from a supplied DC 48 V, and has a configuration including direct current input terminal 9a, voltage changing circuit 9b connected to this direct current input terminal 9a, and plurality of direct current output terminals 9c, 9d, 9e, and 9f connected to this voltage changing circuit 9b, in which voltage changing circuit 9b changes a direct current voltage input from direct current input terminal 9a to a plurality of direct current voltages with different voltage values and outputs these to direct current output terminals 9c through 9f.

Specifically, user-specific voltage changing apparatus 9 is configured so that DC 6 V is output from direct current output terminal 9c, DC 12 V is output from direct current output terminal 9d, DC 48 V is output from direct current output terminal 9e, and DC 300 V is output from direct current output terminal 9f.

Power outlet 13 is connected to direct current output terminal 9c, providing a configuration whereby DC 6 V is output from power outlet 13 via direct current voltage line 13a.

Similarly, power outlet 14 is connected to direct current output terminal 9d, providing a configuration whereby DC 12 V is output from power outlet 14 via direct current voltage line 14a.

Similarly, power outlet 15 is connected to direct current output terminal 9e, providing a configuration whereby DC 48 V is output from power outlet 15 via direct current voltage line 15a.

Similarly, power outlet 16 is connected to direct current output terminal 9f, providing a configuration whereby DC 300 V is output from power outlet 16 via direct current voltage line 16a.

Personal computer 17 is connected to power outlet 13 as an example of an electronic device, telephone 18 is connected to power outlet 14 as an example of an electronic device, television receiver 19 and DVD recorder 20 are connected to power outlet 15 as examples of electronic devices, and air conditioner 21 is connected to power outlet 16 as an example of an electronic device, all these devices being connected in a freely removable fashion.

Personal computer 17 is constructed to be driven at DC 6 V, telephone 18 at DC 12 V, television receiver 19 and DVD recorder 20 at DC 48 V, and air conditioner 21 at DC 300 V.

In voltage changing circuit 9b of user-specific voltage changing apparatus 9, there is an alternating current electrical connection (a cutoff state in direct current electrical terms) between direct current output terminals 9c and 9d by means of capacitor 22, between direct current output terminals 9d and 9e by means of capacitor 23, and between direct current output terminals 9e and 9f by means of capacitor 24, and by this means a state is established in which communication among personal computer 17, telephone 18, television receiver 19, DVD recorder 20, and air conditioner 21, described later herein, can be performed.

That is to say, voltage changing circuit 9b of user-specific voltage changing apparatus 9 is provided with many electronic parts including switching elements for performing voltage changing, and therefore in a state in which this voltage changing circuit 9b is bypassed, a state is established in which communication among personal computer 17, telephone 18, television receiver 19, DVD recorder 20, and air conditioner 21 can be performed.

Figure 2A:
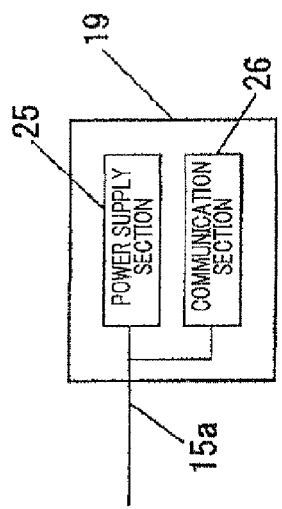
FIG. 2A is a principal-part block diagram of an electronic device used in a direct current power line communication system according to Embodiment 1.
Figure 2B:
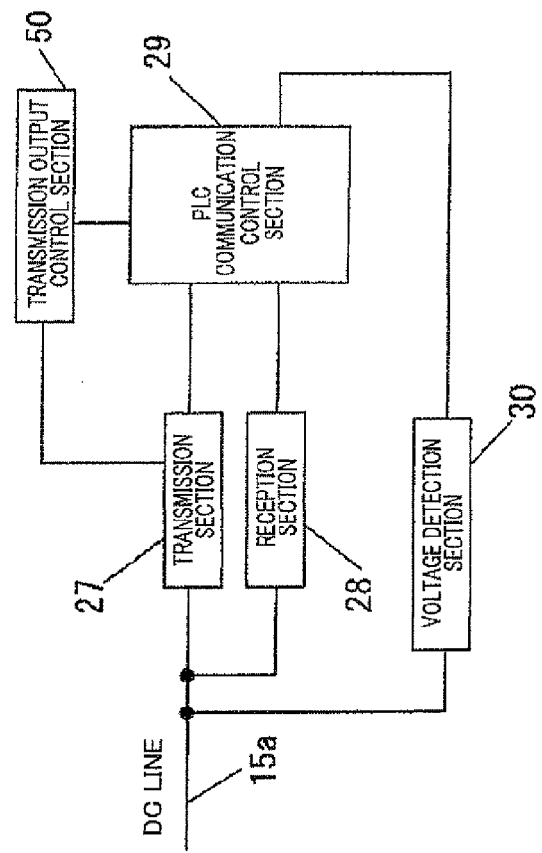
FIG. 2B is a principal-part block diagram of an electronic device used in a direct current power line communication system according to Embodiment 1.

FIG. 2A and FIG. 2B represent personal computer 17, telephone 18, television receiver 19, DVD recorder 20, and air conditioner 21 used as direct current drive type electronic devices, and show voltage supply parts of television receiver 19.

As shown in FIG. 2A, power supply section 25 driven at DC 48 V, and communication section 26 are provided as voltage supply parts of television receiver 19.

As shown in FIG. 2B, communication section 26 has a configuration including direct current voltage line 15a, transmission section 27 and reception section 28 connected to this direct current voltage line 15a, PLC communication control section 29 connected to transmission section 27 and reception section 28, voltage detection section 30 connected to PLC communication control section 29 and direct current voltage line 15a, and transmission output control section 50 connected to PLC communication control section 29 and transmission section 27.

That is to say, a configuration is provided whereby drive voltage information (for this television receiver 19, direct current 48 V) is transmitted from transmission section 27 via direct current voltage line 15a to other direct current drive type electronic devices such as personal computer 17, telephone 18, television receiver 19, DVD recorder 20, and air conditioner 21.

Of course, personal computer 17, telephone 18, television receiver 19, DVD recorder 20, and air conditioner 21 also have the same kind of configuration as shown in FIG. 2A and FIG. 2B, and these direct current drive type electronic devices such as personal computer 17, telephone 18, television receiver 19, DVD recorder 20, and air conditioner 21 are in a state in which communication can be performed as necessary via direct current voltage lines 13a through 16a and capacitors 22 through 24.

Figure 3:
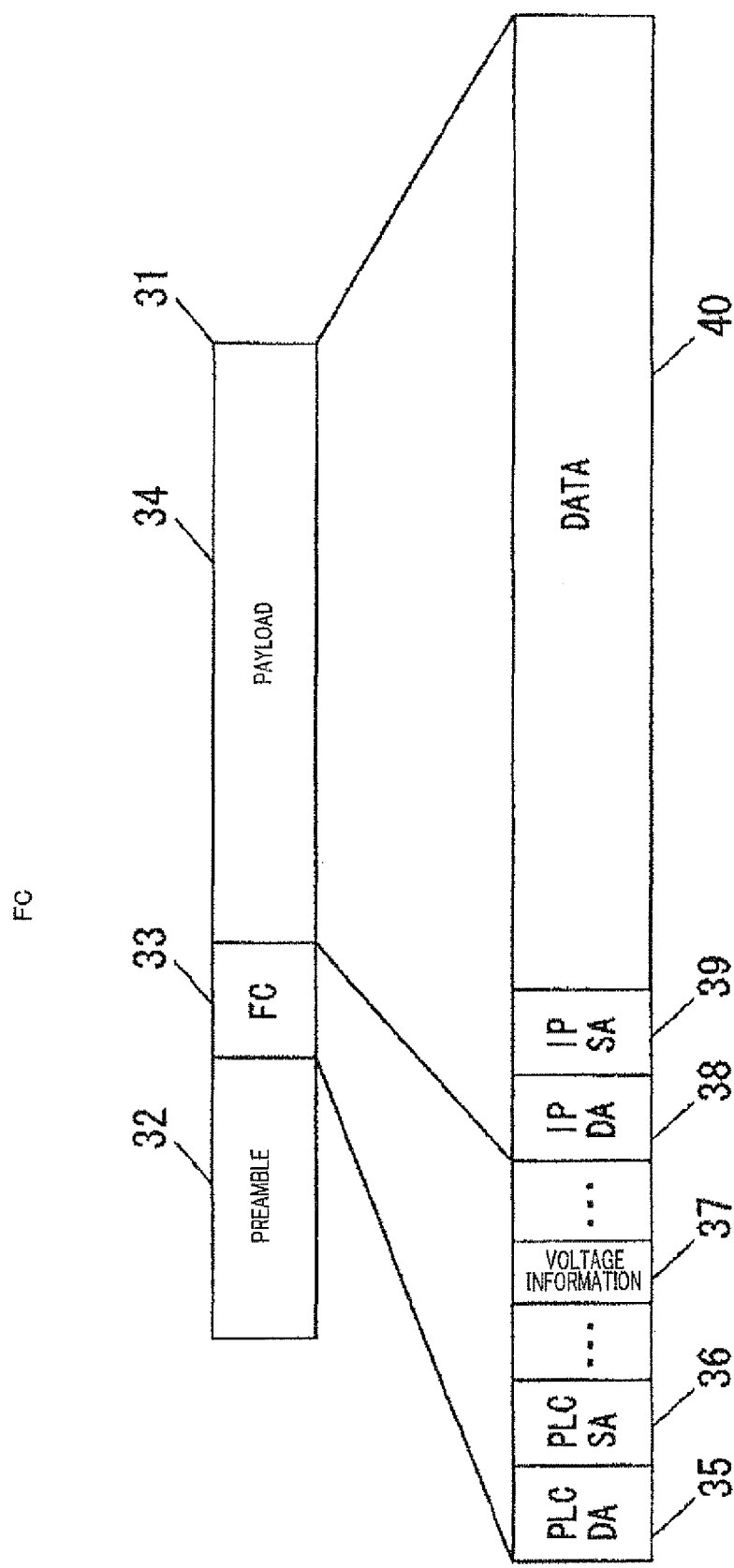
FIG. 3 is a drawing showing a signal in a direct current power line communication system according to Embodiment 1.

FIG. 3 is a drawing showing a signal, for which packet communication is performed, transmitted from one of personal computer 17, telephone 18, television receiver 19, DVD recorder 20, or air conditioner 21, to all the others.

Initial information 32 in frame 31 shown in FIG. 3 is information used for synchronization during transmission/reception and carrier detection, following information 33 is information that includes control information such as a transmission source address, and final information 34 is information that includes actual data (video information, audio information, and so forth).

More precisely, information 33 includes transmission destination PLC address information 35, transmission source PLC address information 36, and drive voltage information 37.

Also, more precisely, information 34 includes transmission destination IP address information 38, transmission source IP address information 39, and actual data information 40.

Figure 4A:
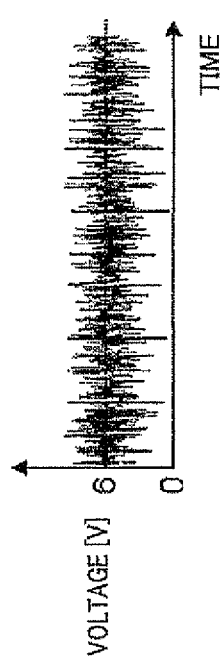
FIG. 4A is a waveform chart showing a signal in a direct current power line communication system according to Embodiment 1.
Figure 4B:
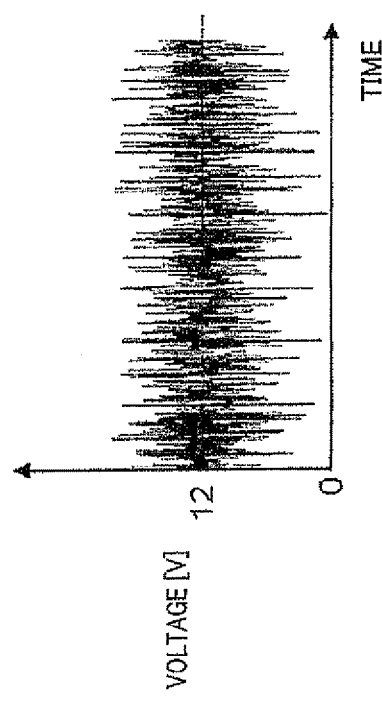
FIG. 4B is a waveform chart showing a signal in a direct current power line communication system according to Embodiment 1.

FIG. 4A and FIG. 4B show actual waveforms whereby the information in FIG. 3 is sent.

Of these, FIG. 4A shows a signal transmitted from personal computer 17 to telephone 18, television receiver 19, DVD recorder 20, and air conditioner 21.

That is to say, since personal computer 17 is driven at DC 6 V as stated above, a state is established in which a signal is placed on this DC 6 V.

On the other hand, FIG. 4B shows a signal for communication among telephone 18, television receiver 19, DVD recorder 20, and air conditioner 21.

That is to say, since telephone 18, television receiver 19, DVD recorder 20, and air conditioner 21 are driven at different drive direct current voltages, a signal is placed on DC 12 V.

To explain the above point in rather more detail, although it is preferable to increase a bias voltage in order to stabilize communication between direct current drive type electronic devices used in individual user premises (home, factory, store, or the like) 2, use of DC 12 V is adequate, and therefore for communication among telephone 18, television receiver 19, DVD recorder 20, and air conditioner 21, a state is established in which a signal is placed on DC 12 V as shown in FIG. 4B.

Also, since personal computer 17 is driven at DC 6 V as stated above, although there is a risk of instability of communication, a state is established in which a signal is placed on DC 6 V as stated above.

A problem here is that, when personal computer 17 communication is performed with telephone 18, television receiver 19, DVD recorder 20, and air conditioner 21, when a signal biased at DC 12 V is sent to personal computer 17 from telephone 18, television receiver 19, DVD recorder 20, or air conditioner 21, that signal is distorted in personal computer 17, and as a result, appropriate communication cannot be performed.

Thus, in this embodiment, as described above, each of personal computer 17, telephone 18, television receiver 19, DVD recorder 20, and air conditioner 21 has a configuration whereby its own drive voltage is reported by sending transmission destination PLC address information 35, transmission source PLC address information 36, drive voltage information 37, transmission destination IP address information 38, and transmission source IP address information 39 to an electronic device other than itself by means of the packet communication in FIG. 3.

Consequently, when, for example, actual data information 40 of DVD recorder 20 is sent to personal computer 17, DVD recorder 20 lowers transmission section 27 bias voltage to DC 6 V by means of transmission output control section 50, and places a signal thereupon.

As a result, in communication between DVD recorder 20 and personal computer 17, actual data information 40 of DVD recorder 20 is not received in distorted fashion by personal computer 17, and the communication is stabilized.

Also, when actual data information 40 of DVD recorder 20 is supplied to television receiver 19, since both are driven at DC 12 V or higher, communication can be performed between the two using a signal with the bias voltage made DC 12 V, as in FIG. 4B, enabling to perform stable communication even if the distance between the two is great.

As described above, an electronic device of this embodiment is provided with a direct current voltage line, a transmission section and reception section connected to this direct current voltage line, a communication control section connected to this transmission section and reception section, a voltage detection section connected to this communication control section and the direct current voltage line, and a transmission output control section connected to the communication control section and transmission section, enabling communication between electronic devices via a power supply line to be stabilized.

That is to say, each electronic device can report the direct current voltage at which it is driven to another electronic device via a direct current voltage line, enabling the size of a signal transmitted to a communicating party to be adjusted between electronic devices intending to perform communication, and as a result, enabling communication between electronic devices via a power supply line to be stabilized.

Also, what is important when performing communication among personal computer 17, telephone 18, television receiver 19, DVD recorder 20, and air conditioner 21 as described above is to perform this communication in a state in which voltage changing circuit 9b is bypassed.

That is to say, voltage changing circuit 9b is provided with many electronic parts including switching elements for performing voltage changing, and therefore when communication is performed among personal computer 17, telephone 18, television receiver 19, DVD recorder 20, and air conditioner 21 via this voltage changing circuit 9b, noise is prone to infiltrate the signal, and therefore provision is made for this communication to be performed in a state in which this is bypassed, as a result of which communication is stabilized.

In order to perform this bypass, as described above, there is an alternating current electrical connection (a cutoff state in direct current electrical terms) in voltage changing circuit 9b between direct current output terminals 9c and 9d by means of capacitor 22, between direct current output terminals 9d and 9e by means of capacitor 23, and between direct current output terminals 9e and 9f by means of capacitor 24, but a noise filter may be provided in the area of these capacitors 22 through 24 in order to strengthen noise countermeasures.

As described above, a user-specific voltage changing apparatus of this embodiment has a configuration including a direct current input terminal, a voltage changing circuit connected to this direct current input terminal, and a plurality of direct current output terminals connected to this voltage changing circuit, in which the voltage changing circuit changes a direct current voltage input from the direct current input terminal to a plurality of direct current voltages with different voltage values and outputs these to the direct current output terminals, and there are alternating current electrical connections between the plurality of direct current output terminals by means of capacitors.

Also, a direct current power line communication system has a configuration including an alternating current-direct current conversion section, a user-specific voltage changing apparatus connected to this alternating current-direct current conversion section, a plurality of power outlets connected to output terminals of this user-specific voltage changing apparatus, and electronic devices connected to this plurality of power outlets, in which the electronic devices have a direct current voltage line, a transmission section and reception section connected to this direct current voltage line, a communication control section connected to this transmission section and reception section, a voltage detection section connected to this communication control section and the direct current voltage line, and a transmission output control section connected to the communication control section and transmission section.

Consequently, if a direct current power line communication system is configured using a user-specific voltage changing apparatus of the present invention, each electronic device can report the direct current voltage at which it is driven to another electronic device via a power outlet connected between direct current output terminals of the voltage changing circuit, enabling to stabilize the size of a signal transmitted to a communicating party to be adjusted between electronic devices intending to perform communication, and as a result, enabling communication between electronic devices via a power supply line.

Also, since provision is made for communication to be performed via capacitors connected between direct current output terminals of the voltage changing circuit, stable communication that is not susceptible to the influence of voltage changing circuit noise can be performed.

Also, what is characteristic of this embodiment is that television receiver 19, DVD recorder 20, and air conditioner 21 transmit a signal resulting from placing a signal on DC 12 V lower than their drive voltages from their transmission section 27.

That is to say, in a DC 48 V system many typical electronic devices such as television receiver 19 or DVD recorder 20 may be connected to power outlet 15, and a plurality of air conditioners 21 may also be connected to power outlet 16 of DC 300 V system within individual user premises (home, factory, store, or the like) 2, and at this time DC 48 V of power outlet 15 and DC 300 V of power outlet 16 may fall.

Thus, provision is made for television receiver 19, DVD recorder 20, and air conditioner 21 connected to these power outlets 15 and 16 to transmit a signal resulting from placing a signal on DC 12 V tower than their drive voltages from their transmission section 27.

By so doing, even if the voltages of power outlets 15 and 16 fall, communication can be performed in a state in which a signal is placed on DC 12 V, and as a result, communication among personal computer 17, telephone 18, television receiver 19, DVD recorder 20, and air conditioner 21 can be stabilized.

Also, television receiver 19 and DVD recorder 20 driven at DC 48 V and air conditioner 21 driven at DC 300 V—higher than DC 12 V (in this embodiment, the second direct current voltage)—also have configurations whereby a signal resulting from placing a signal on DC 12 V lower than their drive voltages is transmitted, so that when a signal is received by another personal computer 17 or telephone 18 from television receiver 19, DVD recorder 20, or air conditioner 21, there is little signal distortion, and communication can be stabilized.

As described above, this embodiment has a configuration including an alternating current-direct current conversion section, a user-specific voltage changing apparatus connected to this alternating current-direct current conversion section, first, second, and third power outlets connected to direct current output terminals of this user-specific voltage changing apparatus, a first electronic device connected to the first power outlet, a second electronic device connected to the second power outlet, and a third electronic device connected to the third power outlet, being configured so that, from direct current output terminals of the user-specific voltage changing apparatus, a first direct current voltage is output to the first power outlet, a second direct current voltage higher than the first direct current voltage is output to the second power outlet, and a third direct current voltage higher than the second direct current voltage is output to the third power outlet, wherein the first, second, and third electronic devices each have a direct current voltage line, a transmission section and reception section connected to this direct current voltage line, a communication control section connected to this transmission section and reception section, a voltage detection section connected to this communication control section and the direct current voltage line, and a transmission output control section connected to the communication control section and transmission section, the transmission section of the first electronic device transmits a signal resulting from placing a signal on the first direct current voltage, and the transmission sections of the second and third electronic devices transmit a signal resulting from placing a signal on the second direct current voltage, enabling communication between electronic devices to be stabilized.

That is to say, in this embodiment, a third electronic device driven at a third direct current voltage higher than the second direct current voltage also has a configuration whereby a signal resulting from placing a signal on the second direct current voltage is transmitted, and therefore communication among the first through third electronic devices can be stabilized even if a plurality of electronic devices are connected to the third-direct-current-voltage power outlet, and the third direct current voltage falls as a result.

Also, a third electronic device driven at a third direct current voltage higher than the second direct current voltage also has a configuration whereby a signal resulting from placing a signal on the second direct current voltage lower than the third direct current voltage is transmitted, so that when a signal from this third electronic device is received by another first or second electronic device, there is little signal distortion, and consequently communication among the first through third electronic devices can be stabilized.

Embodiment 2

Embodiment 2 will now be described with reference to the accompanying drawings. Here, members having the same configuration or function as in Embodiment 1 are assigned the same reference codes as in Embodiment 1, and detailed descriptions thereof are omitted.

Figure 5:
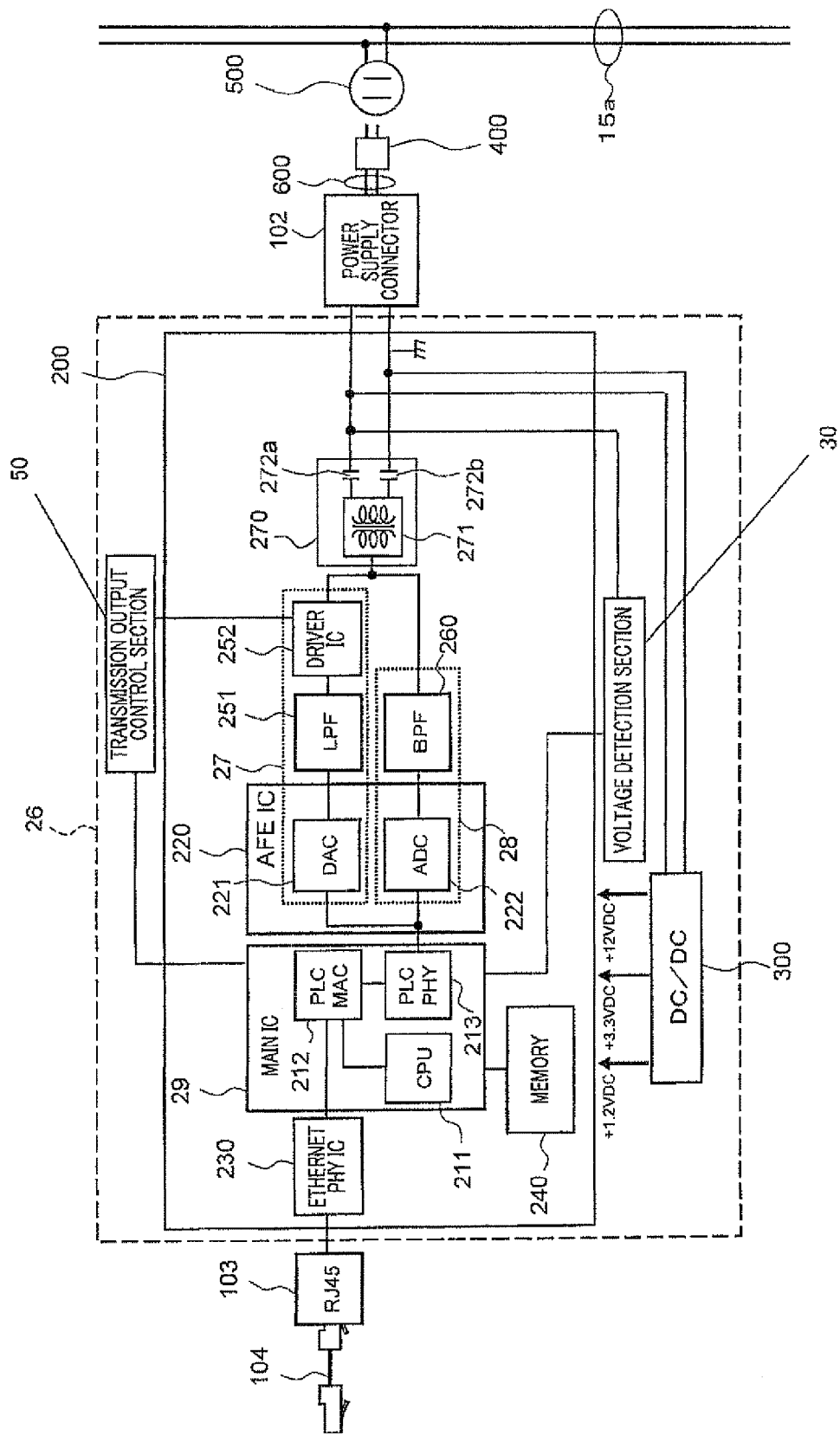
FIG. 5 is a drawing showing an example of the hardware configuration of a communication section according to Embodiment 2.

In this embodiment, an example of the detailed hardware configuration of communication section 26 will be described with reference to FIG. 5. As described in Embodiment 1, communication section 26 is incorporated in electronic devices such as personal computer 17, telephone 18, television receiver 19, DVD recorder 20, and air conditioner 21. In this embodiment, it is assumed that communication section 26 is incorporated in television receiver 19.

Communication section 26 has circuit module 200 and direct current-direct current conversion section (hereinafter also referred to as DC/DC) 300, and above-described voltage detection section 30 and transmission output control section 50.

DC/DC 300 supplies various (for example, +1.2 V, +3.3 V, and +12 V) voltages to circuit module 200, and is provided, for example, with a switching transformer and DC-DC converter (neither of which is shown).

In circuit module 200, PLC communication control section 29, which is the main IC (Integrated Circuit), AFE•IC (Analog Front End•Integrated Circuit) 220, Ethernet (registered trademark) PHY•IC (Physical layer•Integrated Circuit) 230, memory 240, low-pass filter (LPF) 251, driver IC 252, band-pass filter (BPF) 260, and coupler 270 are provided.

DC/DC 300 and coupler 270 are connected to power supply connector 102, and are also connected to direct current voltage line 15a via power supply cable 600, power supply plug 400, and power outlet 15. PLC communication control section 29 functions as a control circuit that performs power line communication.

Also, power supply connector 102 is provided in television receiver 19 (see FIG. 2A and FIG. 2B). Of course, power supply section 25 (see FIG. 2A and FIG. 2B) is connected to power supply connector 102 inside television receiver 19.

Also, modular jack 103 is provided in television receiver 19, and can be connected to Ethernet (registered trademark) cable 104. Consequently, communication section 26 can connect to an external network via modular jack 103 and Ethernet (registered trademark) cable 104.

PLC communication control section 29 is provided with CPU (Central Processing Unit) 211, PLC•MAC (Power Line Communication•Media Access Control layer) block 212, and PLC•PHY (Power Line Communication•Physical layer) block 213.

CPU 211 comprises a 32-bit RISC (Reduced Instruction Set Computer) processor. CPU 211 uses data stored in memory 240 to control the operation of PLC•MAC block 212 and PLC•PHY block 213, and also performs control of overall communication section 26. PLC•MAC block 212 manages MAC layer (Media Access Control layer) of the transmission/received signal, and PLC•PHY block 213 manages PHY layer (Physical layer) of the transmission/received signal.

AFE•IC 220 is provided with D/A converter (DAC) 221 and A/D converter (ADC) 222. Coupler 270 is provided with coil transformer 271 and coupling capacitors 272a and 272b.

A brief description of how communication section 26 performs communication is given below.

Data input from modular jack 103 is sent to PLC communication control section 29 via Ethernet (registered trademark) PHY•IC 230, and undergoes digital signal processing to generate a digital transmission signal. The generated digital transmission signal is converted to an analog signal by D/A converter (DAC) 221 of AFE•IC 220, and is output to direct current voltage line 15a via low-pass filter 251, driver IC 252, coupler 270, power supply connector 102, power supply cable 600, power supply plug 400, and power outlet 15.

A signal received from direct current voltage line 15a is sent to band-pass filter 260 via coupler 270, and is converted to a digital signal by A/D converter (ADC) 222 of AFE•IC 220. Then the converted digital signal is sent to PLC communication control section 29, and is converted to digital data by means of digital signal processing. The converted digital data is output from modular jack 103 via Ethernet (registered trademark) PHY•IC 230.

Naturally, a signal received from direct current voltage line 15a can also be output to direct current voltage line 15a again.

In order to perform signal transmission/reception as described above, transmission section 27 described in Embodiment 1 is provided with D/A converter (DAC) 221, low-pass filter 251, and driver IC 252, and reception section 28 is provided with A/D converter (ADC) 222 and band-pass filter 260.

Next, an example of digital signal processing implemented by PLC communication control section 29 will be described. Communication section 26 uses an OFDM (Orthogonal Frequency Division Multiplexing) signal or suchlike multicarrier signal generated using a plurality of subcarriers as a signal for transmission. Communication section 26 converts data to be transmitted to an OFDM signal or suchlike multicarrier transmission signal and outputs this signal, and also processes an OFDM signal or suchlike multicarrier received signal and converts it to received data. Digital signal processing for these conversions is mainly performed by PLC•PHY block 213.

Ethernet (registered trademark) PHY•IC 230 may be provided in television receiver 19 instead of in communication section 26. Also, communication section 26 may be provided externally instead of being incorporated in television receiver 19. At this time, modular jacks 103 are provided in communication section 26 and television receiver 19, and communication section 26 and television receiver 19 are connected via Ethernet (registered trademark) cable 104. Furthermore, if television receiver 19 is connected to an external network, it is possible for communication section 26 to access that external network.

The configuration of DC/DC 300 differs according to the direct current voltage line to which it is connected. For example, television receiver 19 connected to direct current voltage line 15a is supplied with DC 48 V. DC/DC 300 in television receiver 19 performs conversion to various voltages lower than 48 V (for example, +1.2 V, +3.3 V, +12 V). On the other hand, personal computer 17 connected to direct current voltage line 13a is supplied with DC 6 V. Therefore, in order to output DC 12 V, DC/DC 300 in personal computer 17 requires a configuration capable of amplifying DC 6 V. Based on what has been described above, it is preferable for DC/DC 300 also to have a configuration capable of amplifying and converting a supplied voltage.

Next, an example of the hardware configuration of voltage detection section 30 will be described with reference to FIG. 6.

Figure 6:
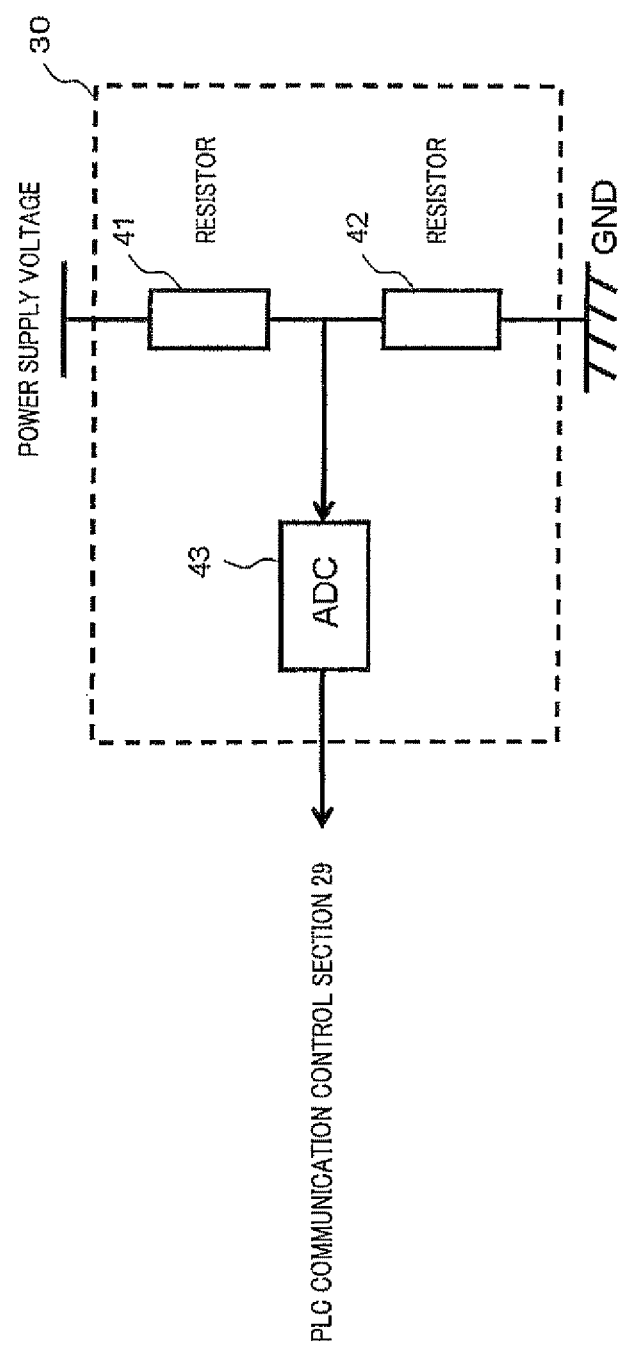
FIG. 6 is a drawing showing an example of the hardware configuration of a voltage detection section according to Embodiment 2.

Voltage detection section 30 shown in FIG. 6 is provided with resistor 41, resistor 42, and A/D converter (ADC) 43.

Resistor 41 is connected between a power supply voltage (voltage of direct current voltage line 15a) and resistor 42, and resistor 42 is connected between resistor 41 and GND (Ground).

A/D converter 43 detects and digitizes a potential between resistor 41 and resistor 42. The A/D converter generates information in which this detected potential is converted to a power supply voltage (that is, drive voltage information), and reports the result to PLC communication control section 29.

Connectable voltage values for A/D converter 43 are generally limited to a predetermined range. Consequently, in this embodiment, a power supply voltage (voltage of direct current voltage line 15a) is divided by resistor 41 and resistor 42. By this means, even if a power supply voltage is too large for A/D converter 43 to detect, a voltage actually detected by A/D converter 43 is smaller than the power supply voltage. Therefore, the upper limit of voltage values that can be detected by voltage detection section 30 can be raised.

For example, when resistor 41 is 1 k'Ω and resistor 42 is 1 k'Ω, the potential between resistor 41 and resistor 42 (the voltage applied to resistor 42) is half the power supply voltage. That is to say, when the power supply voltage is 12 V, the voltage value actually detected by ADC 43 is 6 V. In this case, A/D converter 43 creates voltage information of a value (12 V) that is twice the voltage value (6 V) that is actually detected, and reports this voltage information to PLC communication control section 29.

Of course, what multiple of a detected voltage A/D converter 43 reports is decided by the configuration of voltage detection section 30. That is to say, this depends on the resistance values of resistor 41 and resistor 42 for dividing the power supply voltage. For example, when resistor 41 is 3 k'Ω, resistor 42 is 1 k'Ω, and the power supply voltage is 12 V, A/D converter 43 detects 3 V, and reports voltage information in which this is quadrupled to PLC communication control section 29.

Above, two kinds of examples of resistance values of resistor 41 and resistor 42 have been given, but making the resistance value of resistor 41 larger than the resistance value of resistor 42 is preferable since a voltage value detected by A/D converter 43 can be made smaller. That is to say, the upper limit detectable by A/D converter 43 can be raised.

Provision may also be made for A/D converter 43 to report a detected voltage value as is to PLC communication control section 29, and for PLC communication control section 29 to create power supply voltage information. For example, when resistor 41 is 1 k'Ω and resistor 42 is 1 k'Ω, PLC communication control section 29 stores a value that is twice a voltage value reported from A/D converter 43 in memory 240 as a power supply voltage. Also, the number of resistors connected in series between a power supply voltage and GND is not limited to two, but may be three or four. Furthermore, PLC communication control section 29 may store acquired voltage information within itself or in memory 240.

Next, an example of the hardware configuration of transmission output control section 50 will be described with reference to FIG. 7.

Figure 7:
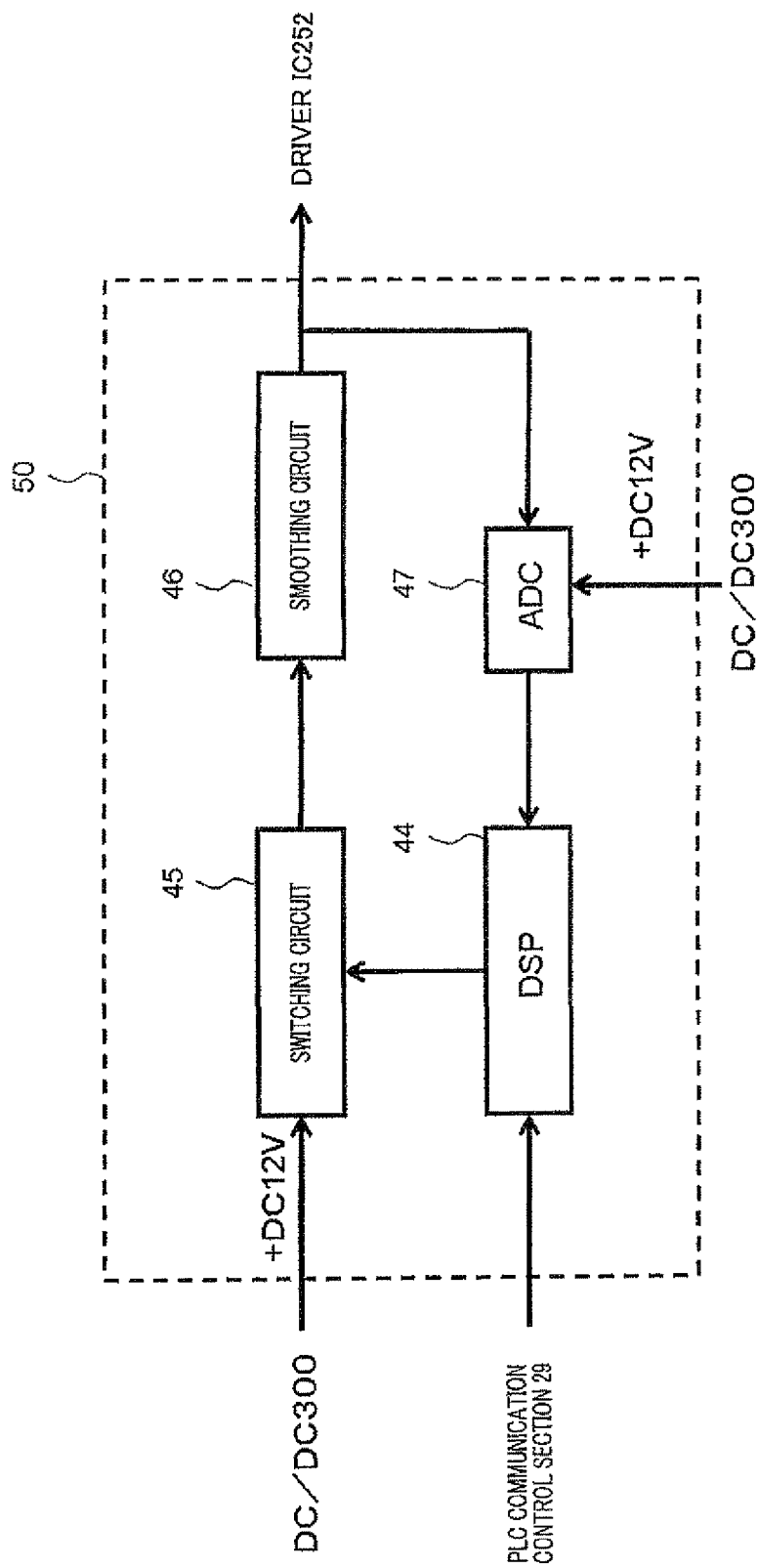
FIG. 7 is a drawing showing an example of the hardware configuration of a transmission output control section according to Embodiment 2.

Transmission output control section 50 shown in FIG. 7 is provided with DSP (Digital. Signal Processor) 44, switching circuit 45, smoothing circuit 46 that includes a capacitor, and A/D converter (ADC) 47. Transmission output control section 50 including these converts supplied DC 12 V to a direct current voltage of a desired value, and supplies this converted direct current voltage to driver IC 252. Then driver IC 252 generates a signal with an amplitude of the supplied direct current voltage, and coupler 270 superimposes this signal on direct current voltage line 15*a*.

DSP 44 takes on some of the functions of CPU 211. Therefore, DSP 44 is a control section of transmission output control section 50, and performs control specified by CPU 211 of PLC communication control section 29 in transmission output control section 50.

Switching circuit 45 functioning as a power feed control section performs on/off switching based on DSP 44 control. In other words, switching circuit 45 supplies DC 12 V intermittently to smoothing circuit 46.

To be more specific, switching circuit 45 is supplied with DC 12 V, which is one of the direct current voltages generated by DC/DC 300, and DC 12 V is supplied to smoothing circuit 46 when the switch is on, whereas a direct current voltage is not supplied to smoothing circuit 46 when the switch is off.

Smoothing circuit 46 functioning as a supply voltage control section performs time averaging of supplied DC 12 V. For example, when the switch on time and switch off time are the same (when on/off switching is repeated at the same time), smoothing circuit 46 generates a voltage that is supplied per unit time. That is to say, smoothing circuit 46 generates DC 6 V. This DC 6 V is then supplied to driver IC 252.

Furthermore, A/D converter 47 operating at DC 12 V, which is one of the direct current voltages generated by DC/DC 300, detects a direct current voltage value supplied to this driver IC 252. This detected direct current voltage value is then reported to DSP 44.

By this means, transmission output control section 50 can apply feedback of an output voltage to driver IC 252. That is to say, DSP 44 can change on/off timing of the switch of switching circuit 45 based on reported output voltage information. For example, if it is wished to output DC 6 V but A/D converter 47 detects 5.5 V, DSP 44 can make an adjustment such as lengthening the switch on time. Therefore, transmission output control section 50 can output a direct current voltage of a desired value more accurately by feeding back information on an output voltage to driver IC 252.

It goes without saying that CPU 211 may perform the same kind of operation as DSP 44.

In the above way, transmission output control section 50 converts a supplied direct current voltage (DC 12 V) to a direct current voltage of a desired value, and supplies this direct current voltage to driver IC 252. By this means, driver IC 252 can generate and transmit a signal of desired amplitude. For example, when DC 6 V is supplied to driver IC 252, driver IC 252 transmits a 6 V amplitude signal. However, in the case of this embodiment, a voltage supplied to transmission output control section 50 is DC 12 V, and therefore a voltage value that can be output by transmission output control section 50 is 12 V or below.

Having transmission output control section 50 control the amplitude (hereinafter also referred to as signal voltage) of a transmission signal in this way enables transmission to be performed at a signal voltage in accordance with the drive voltage of the transmission destination. However, in this embodiment the maximum signal voltage is 12 V, since the voltage supplied to transmission output control section 50 by DC/DC 300 is 12 V and transmission output control section 50 has the above-described configuration.

While transmission output control section 50 of this embodiment can perform conversion to a direct current voltage lower than a direct current voltage supplied by means of the above-described configuration, it is preferable for a configuration to be provided that enables a supplied direct current voltage to be amplified. By this means, the range of direct current voltage values that can be supplied to driver IC 252 by transmission output control section 50 can be increased.

Here, the reason for coordinating a transmission destination drive voltage and signal voltage (referred to as bias voltage in Embodiment 1) will be explained.

Communication section 26 incorporated in an electronic device transmits a signal as a waveform as shown in FIG. 4A and FIG. 4B. This signal is attenuated by noise in a channel (direct current voltage line). In order to improve the possibility of being able to receive this signal correctly on the receiving side, it is necessary to increase the signal-to-noise ratio (S/N ratio). That is to say, it is necessary either to increase the signal voltage (signal level) of a transmission signal or to reduce noise. Thus, in this embodiment, a configuration is assumed that the receiving side is made easier to analyze a signal by increasing the signal voltage of a signal (by increasing the S/N ratio). Since communication between electronic devices of direct current drive can be stabilized by this means, communication between electronic devices driven at DC 12 V or above is performed at a maximum signal voltage of 12 V.

However, when a 12 V signal voltage transmission signal is transmitted to DC 6 V direct current voltage line 13*a*, the amplitude of this transmission signal is distorted to 6 V. Consequently, there is a risk of personal computer 17 connected to direct current voltage line 13*a* mistaking this transmission signal for noise. Thus, in this embodiment, transmission output control section 50 transmits at a signal voltage in accordance with the drive voltage of the transmission destination. By this means, communication between electronic devices of direct current drive can be stabilized.

On the other hand, even if a 6 V signal voltage signal is transmitted to DC 12 V direct current voltage line 14*a*, this signal is not distorted, and therefore telephone 18 can receive this signal.

To summarize the above, it is desirable to transmit at a signal voltage lower than the voltage of the transmission destination direct current voltage line, and it is not desirable to transmit at a signal voltage higher than the voltage of the transmission destination direct current voltage line. Also, a higher signal voltage is desirable since it enables the S/N ratio to be increased. A signal voltage should be no higher than the transmission destination drive voltage, and the closer to the transmission destination drive voltage the better.

In order to achieve such a communication environment, in this embodiment each electronic device reports its drive voltage to another electronic device. Then transmission output control section 50 controls the signal voltage based on transmission destination drive voltage information. That is to say, the signal voltage is controlled in accordance with the transmission destination drive voltage. By this means, communication can be stabilized.

For example, when telephone 18 transmits a signal to personal computer 17, telephone 18 transmits with the signal voltage of this signal set to 6 V. And when telephone 18 transmits to television receiver 19, telephone 18 transmits with the signal voltage of this signal set to 12 V. Of course, if the maximum signal voltage of communication section 26 of telephone 18 is 48 V, transmission may be performed with the signal voltage of the signal at 48 V.

This maximum signal voltage will be taken as a reference voltage below. If a transmission destination drive voltage is higher than this reference voltage, it is made the voltage of the reference voltage. The reference voltage need not be a maximum signal voltage, but may be 10 V or 8 V instead. However, as explained above, it is desirable for a signal voltage to be on the high side of a range receivable on the receiving side, and therefore it is desirable for the reference voltage to be made a maximum signal voltage.

When telephone 18 transmits a signal to personal computer 17, although it is preferable for the signal voltage to be made 6 V or below, as explained above, telephone 18 may also transmit with this signal voltage at 6.1 V, 6.2 V, or the like. At this time, this signal is somewhat distorted, but there is a possibility of personal computer 17 being able to receive this signal. Therefore, an electronic device may also transmit a signal at a signal voltage in the vicinity of the transmission destination drive voltage.

Also, when personal computer 17 transmits a signal to telephone 18, if personal computer 17 transmits this signal at a 12 V signal voltage in accordance with the drive voltage of the transmission destination (telephone 18), there is a possibility of this signal being reduced on direct current voltage line 13a. Thus, personal computer 17 transmits a signal to telephone 18 using a 6 V signal voltage.

A direct current voltage supplied to driver IC 252 may also be adjusted by means of a variable resistor or the like. However, if a voltage is controlled with a variable resistor, the voltage is generally unstable. Consequently, it is preferable for transmission output control section 50 to be provided in communication section 26.

In this embodiment, an electronic device has a configuration whereby voltage information, which is one indicator of a direct current voltage line, is reported to another electronic device, but current information of direct current voltage line or power information may also be reported.

As shown in FIG. 1, capacitors 22 through 24 respectively are connected between direct current voltage lines 13a through 16a, but capacitors need not necessarily connect adjacent direct current voltage lines. For example, a capacitor that connects direct current voltage line 13a and direct current voltage line 16A may be provided. Connecting direct current voltage lines directly with capacitors makes a signal transmitted between electronic devices less susceptible to attenuation than when bypassing is performed via a plurality of capacitors.

An element that performs bypassing between direct current voltage lines is not limited to a capacitor, and an impedance element may also be used.

Also, by connecting direct current generation section (for example, solar battery system) 10 to user-specific voltage changing apparatus 9, as shown in FIG. 1, user-specific voltage changing apparatus 9 is supplied with a direct current voltage not only from alternating current-direct current conversion section 3 but also from direct current generation section 10. By this means, a direct current voltage can be supplied to user-specific voltage changing apparatus 9 from direct current generation section 10 as well. At this time, direct current generation section 10 can supply a direct current voltage directly to user-specific voltage changing apparatus 9, without converting an alternating current to a direct current. Consequently, direct current generation section 10 does not suffer voltage loss that occurs when an alternating current is converted to a direct current, as in the case of alternating current-direct current conversion section 3, and provides good power utilization efficiency.

Furthermore, by connecting direct current storage section (for example, storage battery) 11 to user-specific voltage changing apparatus 9, as shown in FIG. 1, direct current storage section 11 can store a direct current voltage supplied from alternating current-direct current conversion section 3. By this means, a direct current voltage can be stored in direct current storage section 11 when not necessary, enabling power utilization efficiency to be improved.

Embodiment 3

Embodiment 3 will now be described with reference to the accompanying drawings. Here, members having the same configuration or function as in Embodiments 1 and 2 are assigned the same reference codes as in Embodiments 1 and 2, and detailed descriptions thereof are omitted.

First, a network formed among electronic devices connected to user-specific voltage changing apparatus 9 in this embodiment (hereinafter referred to as "network") will be described with reference to FIG. 1.

In this embodiment, a network is formed by telephone 18 and television receiver 19. That is to say, telephone 18 and television receiver 19 are connected to user-specific voltage changing apparatus 9. At this time, in this embodiment, telephone 18 is the main unit and television receiver 19 is a sub-unit.

It is not necessary to change the configuration of communication sections 26 incorporated in various electronic devices according to differences between a main unit and sub-unit. That is to say, all communication sections 26 can be either a main unit or a sub-unit. Therefore, a user need only set a main unit or sub-unit decision. Also, since a main unit with a drive voltage of less than 12 V does not output a 12 V signal voltage, a signal for reporting to a sub-unit by this main unit is smaller than 12 V. Consequently, when the drive voltage of a main unit is less than 12 V, this main unit should preferably be connected to a router.

Telephone 18, the main unit, transmits a beacon to each electronic device in the network. By this means, each electronic device in the network can share information on network conditions. Thus, the network status can be maintained.

Electronic devices present in the network are a main unit (telephone 18) and television receiver 19 (sub-unit). That is to say, electronic devices present in the network are all driven at 12 V or above. In other words, electronic devices present in the network are all connected to a 12 V or higher direct current voltage line. Therefore, the main unit (telephone 18) performs broadcast transmission of a beacon at the maximum signal voltage of 12 V. In other words, the main unit (telephone 18) transmits a 12 V signal voltage beacon to all the electronic devices in the network non-specifically.

Figure 8:
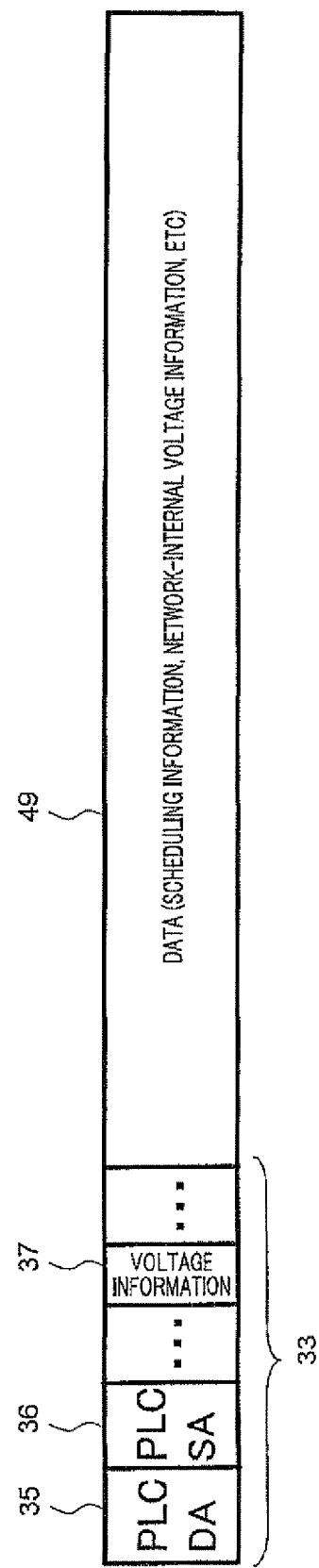
FIG. 8 is a drawing showing an example of a frame format of a beacon according to Embodiment 3.

The frame format of this beacon will now be described with reference to FIG. 8.

Frame 48 is a beacon frame format, and has the same kind of header (information 32 and information 33) as frame 31 shown in FIG. 3. Therefore, voltage information 37 stores information on the drive voltage of the main unit (telephone 18).

Information 49, which is actual data, stores scheduling information, network-internal voltage information, and so forth.

Scheduling information is, for example, information indicating the channel utilization status or the like. In the case of this embodiment, a direct current voltage line, which is also a channel, is shared by electronic devices in the network. If communication section 26 of each electronic device transmits a signal to a channel at the same time, there is a possibility of the signal not being transmitted, and therefore the main unit (telephone 18) reports a schedule to each sub-unit by means of a beacon (frame 48).

Network-internal voltage information includes at least information on the minimum drive voltage in the network. By this means, a sub-unit receiving a beacon (frame 48) can ascertain the minimum drive voltage in the network.

The drive voltage and address of each electronic device in the network may also be stored in network-internal voltage information. By this means, a sub-unit can acquire detailed network-internal drive voltage information simply by receiving a beacon.

A beacon is transmitted a plurality of times in order to maintain the network status. Therefore, if a large amount of information is stored in information 49, there is a possibility of substantive communication between electronic devices being impeded. Consequently, the volume of information 49 should be kept as small as possible. Therefore, in this embodiment, at least information on the minimum drive voltage in the network is stored in information 49. Also, in this embodiment a configuration is used whereby a beacon is transmitted at fixed intervals in order to maintain the network status.

As stated above, main unit (telephone 18) drive voltage information is stored in voltage information 37. This drive voltage information may also be included in network-internal voltage information, but in this embodiment voltage information 37 is provided in the header of frame 48 in order to provide commonality with the header of frame 31. By this means, the header parts of frames transmitted in the network are made common, enabling communication section 26 digital signal processing to be simplified.

Figure 9:
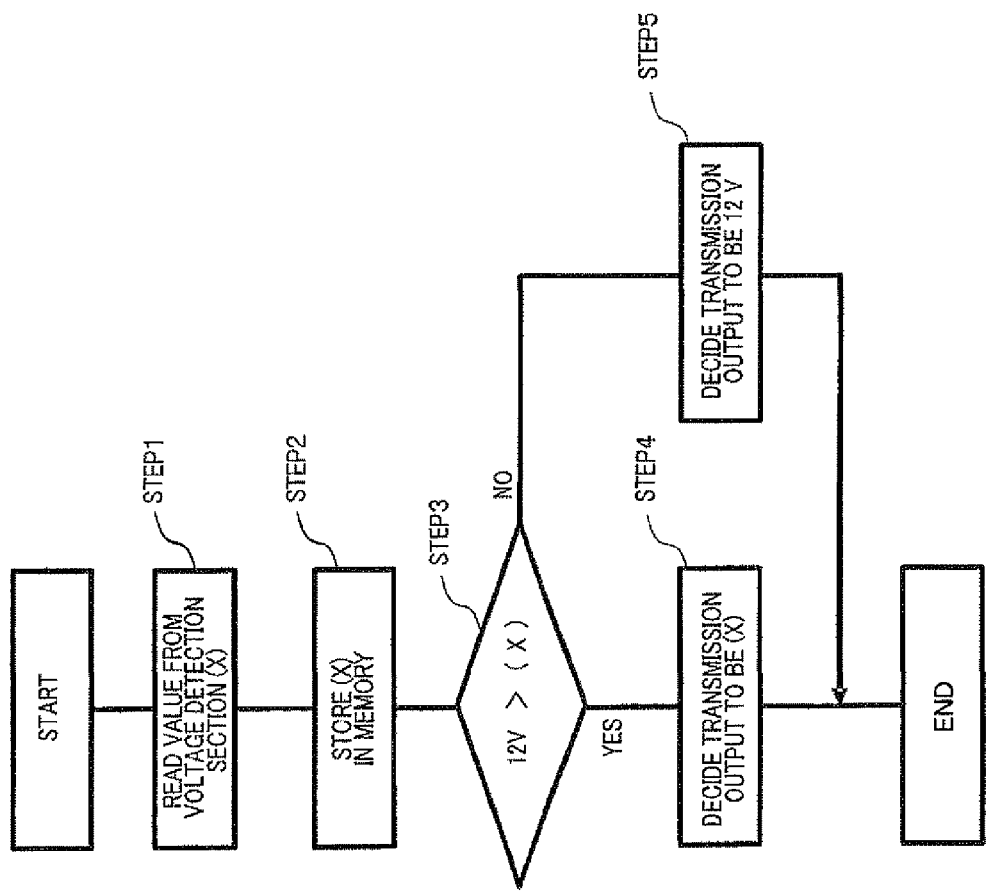
FIG. 9 is a flowchart showing an example of a transmission output decision method according to Embodiment 3.

Next, a method of a deciding a signal voltage to an electronic device newly connected to a network in this embodiment will be described with reference to FIG. 9. Here, an electronic device newly connected to a network is assumed to be a newly entering sub-unit.

When a newly entering sub-unit is connected to a direct current voltage line, voltage detection section 30 detects the voltage value of this direct current voltage line (hereinafter referred to as direct current voltage X) (step 1). Then voltage detection section 30 reports this direct current voltage X to PLC communication control section 29, and PLC communication control section 29 stores this direct current voltage X in PLC communication control section 29 or memory 240 (step 2). Next, PLC communication control section 29 compares direct current voltage X with DC 12 V (step 3). If direct current voltage X is smaller than DC 12 V, PLC communication control section 29 decides the signal voltage to be direct current voltage X (step 4). If direct current voltage X is larger than DC 12 V, PLC communication control section 29 decides the signal voltage to be DC 12 V (step 5).

Since the signal voltage is decided as described above, a newly entering sub-unit can transmit a signal at a voltage appropriate to the direct current voltage line to which it is connected.

When communication section 26 is incorporated in an electronic device as in this embodiment, this communication section 26 is normally always connected to a direct current voltage line of the same value. Consequently, a signal voltage may be decided beforehand for each electronic device according to that electronic device. However, in anticipation of a case in which a user inadvertently does not connect an electronic device to the power outlet to which it should be connected (such as a case in which telephone 18 is connected to power outlet 16, for example), it is preferable for each electronic device to be provided with a function for reporting this state to the user. That is to say, when by detecting the voltage value of the connected direct current voltage line, voltage detection section 30 finds out that it is not the direct current voltage line that should be connected to, communication section 26 cuts the power feed from the direct current voltage line. Of course, communication section 26 also cuts the power feed from the direct current voltage line to power supply section 25. By this means, the safety of each electronic device can be assured. Furthermore, it is preferable for each electronic device to be provided with an alarm function enabling the user to confirm visually or audibly this state in which the power feed has been cut.

Figure 10:
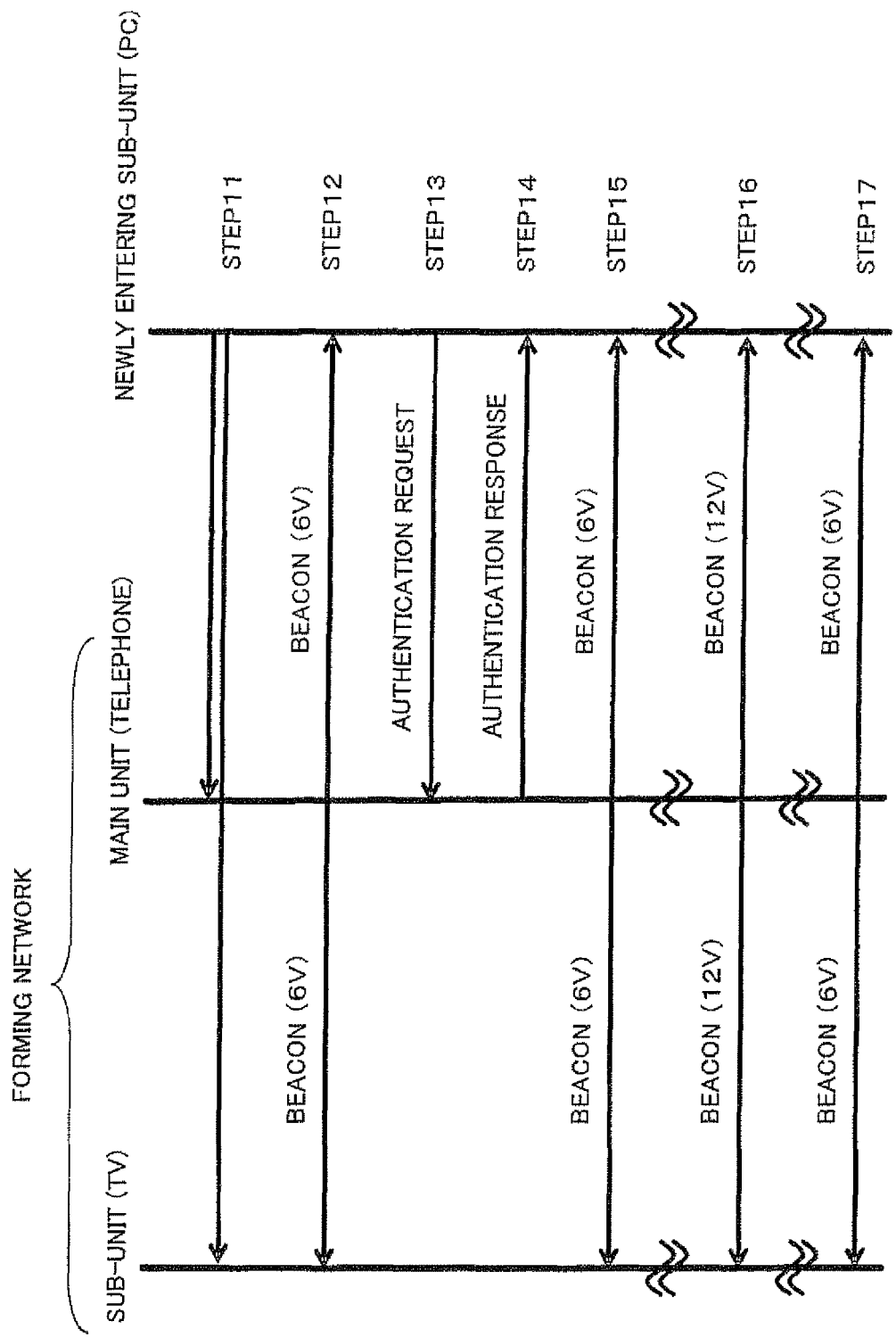
FIG. 10 is a flowchart showing an example of a voltage information reporting method according to Embodiment 3.

Next, a method of reporting network-internal voltage information when a newly entering sub-unit that decides a transmission signal voltage as described above is connected to the above-described network will be described with reference to FIG. 10. The newly entering sub-unit is assumed to be personal computer 17.

In step 11, the newly entering sub-unit (personal computer 17) is connected to user-specific voltage changing apparatus 9, and performs broadcast transmission of a voltage reporting frame for reporting information on a signal voltage (6 V) decided as described above if a beacon cannot be received for a certain time. At least information on the device's own drive voltage should be included in this voltage reporting frame. On receiving the voltage reporting frame, the main unit (telephone 18) recognizes that an electronic device has been newly connected to the network.

In step 12, the main unit (telephone 18) compares the drive voltage of the newly entering sub-unit (personal computer 17) acquired in step 11 with minimum drive voltage information that it holds itself, and immediately transmits a beacon at a signal voltage of the lower voltage value. Thus, in the case of this embodiment, although a beacon has previously been transmitted at DC 12 V, a beacon with the signal voltage changed to DC 6 V is transmitted to sub-units. By this means, the newly entering sub-unit (personal computer 17) driven at the minimum drive voltage in the network (DC 6 V) can receive a beacon more dependably. Also, the newly entering sub-unit (personal computer 17) that receives a 6 V signal voltage beacon acquires the address of the main unit (telephone 18), and stores this address in memory 240. Furthermore, television receiver 19 recognizes that the minimum drive voltage in the network has been changed.

In step 13, the newly entering sub-unit (personal computer 17) transmits an authentication request frame to the main unit (telephone 18) address acquired in step 12. By receiving the authentication request frame, the main unit (telephone 18) acquires the address of personal computer 17 (the newly entering sub-unit) and so forth. By this means, the information stored in beacon information 49 is updated.

In step 14, the main unit (telephone 18) transmits an authentication response frame to the newly entering sub-unit (personal computer 17). By this means, the newly entering sub-unit (personal computer 17) enters the network.

In step 15, the main unit (telephone 18) transmits an updated beacon to sub-units in the network at 6 V.

In step 16, the main unit (telephone 18) transmits an updated beacon to sub-units in the network at 12 V.

In step 17, the main unit (telephone 18) transmits an updated beacon to sub-units in the network at 6 V.

Through beacon transmission by the main unit (telephone 18) as described above, sub-units (television receiver 19 and personal computer 17) can recognize the minimum drive voltage in the network.

In this embodiment, a newly entering sub-unit (personal computer 17) is connected to a network, and a configuration is used whereby, when a beacon cannot be received for a certain time, communication section 26 of the newly entering sub-unit (personal computer 17) performs broadcast transmission of a voltage reporting frame storing drive voltage information of that device. By this means, the main unit (telephone 18) recognizes the existence of the newly entering sub-unit (personal computer 17) and also recognizes the drive voltage of the newly entering sub-unit (personal computer 17). At this time, the main unit (telephone 18) compares the signal voltage of the current beacon with the drive voltage of the newly entering sub-unit (personal computer 17).

In the case of this embodiment, the drive voltage of the newly entering sub-unit (personal computer 17) is lower, and therefore, after receiving a voltage reporting frame, the main unit (telephone 18) immediately transmits a beacon to the sub-units with the signal voltage changed to the drive voltage (DC 6 V) of the newly entering sub-unit (personal computer 17).

Lowering the beacon signal voltage enables the newly entering sub-unit (personal computer 17) to receive a beacon more dependably. Also, by receiving this beacon, the newly entering sub-unit (personal computer 17) can acquire the address of the main unit (telephone 18). By this means, the newly entering sub-unit (personal computer 17) can make a network authentication request to the main unit (telephone 18).

When connection of the newly entering sub-unit (personal computer 17) to the network is approved by the main unit (telephone 18), the network then comprises two electronic devices driven at DC 12 V or above and one electronic device driven at DC 6 V.

Thus, the main unit (telephone 18) transmits beacons at different signal voltages to sub-units in the network so that all the electronic devices in the network can receive beacons. In this embodiment, the network-internal minimum drive voltage of 6 V and the communication section 26 maximum signal voltage of 12 V are used. That is to say, communication section 26 transmits a 6 V signal voltage beacon that can be received by all the sub-units in the network, and also transmits a 12 V signal voltage beacon desirable for a sub-unit driven at DC 12 V or above. By this means, sub-units driven at various direct current voltages in the network can receive a beacon more dependably. Thus, information within the network can be shared more dependably, enabling stabilization of communication among electronic devices in the network to be achieved.

Also, in this embodiment, a 6 V signal voltage beacon is transmitted preferentially to sub-units. For example, after step 17, the main unit (telephone 18) transmits beacons to each sub-unit (television receiver 19 and personal computer 17), controlling the signal voltage to 6 V, 12 V, 6 V, and 6 V in turn. That is to say, the proportion of beacons transmitted at a signal voltage capable of being received by all the sub-units in the network is made larger. By this means, the possibility of a sub-unit driven at less than DC 12 V not being able to receive a beacon can be limited.

Since voltage information is shared as described above, electronic devices in a network can share information within the network in real time more dependably. Thus, even if a new electronic device is connected to the network, information can be shared within the network in accordance with the newly entering sub-unit (personal computer 17).

By means of the above, communication within a network can be stabilized.

In this embodiment, beacons are transmitted to sub-units at two signal voltages of different values, but the number is not limited to two, and beacons may be transmitted to sub-units using a greater number of different signal voltages.

Provision may also be made for a main unit to transmit necessary information to sub-units on an individual basis rather than transmitting beacons to subunits in unison. For example, in the case of this embodiment, after confirming drive voltage information of newly entering sub-unit (personal computer 17), the main unit (telephone 18) can report to a sub-unit (television receiver 19) originally connected to the network that the minimum drive voltage in the network has been changed (from 12 V to 6 V).

The newly entering sub-unit (personal computer 17) may also use the same kind of header (information 32 and information 33) as frame 31 and frame 48 in a voltage reporting frame. By this means, digital signal processing of communication section 26 can be simplified, and the newly entering sub-unit (personal computer 17) can report its own address to the main unit (telephone 18). Therefore, instead of sending a 6 V signal voltage beacon to an unspecified sub-unit, the main unit (telephone 18) can send a beacon only to a specified newly entering sub-unit (personal computer 17). Thus, unnecessary signals are no longer transmitted to a direct current voltage line, enabling stabilization of communication within the network to be achieved.

Embodiment 4

Figure 11:
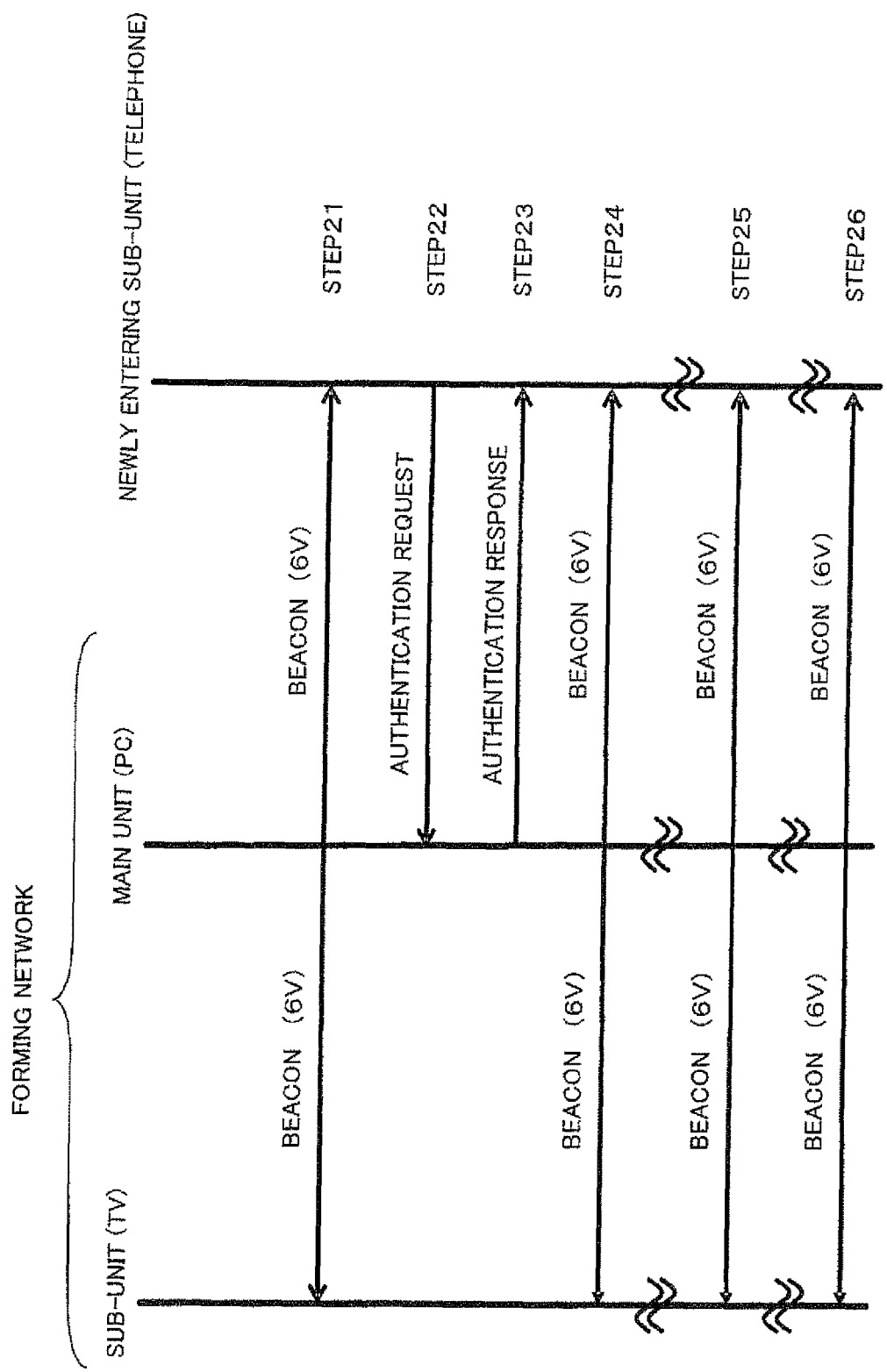
FIG. 11 is a flowchart showing an example of a voltage information reporting method according to Embodiment 4.

Embodiment 4 will now be described with reference to FIG. 11. Here, members having the same configuration or function as in Embodiments 1 through 3 are assigned the same reference codes as in Embodiments 1 through 3, and detailed descriptions thereof are omitted.

In this embodiment, it is assumed that telephone 18 is newly connected to a network formed by personal computer 17 and television receiver 19. Here, personal computer 17 is the main unit, television receiver 19 is a sub-unit, and telephone 18 is a newly entering sub-unit. Therefore, since the main unit (personal computer 17) is driven at DC 6 V, it transmits a 6 V signal voltage beacon to a sub-unit.

A voltage information reporting method in this embodiment is described below with reference to FIG. 11.

In step 21, the main unit (personal computer 17) performs broadcast transmission of a 6 V signal voltage beacon to the sub-units. At this time, the newly entering sub-unit (telephone 18) can receive this beacon since telephone 18 is driven at DC 12 V. By receiving the beacon, the newly entering sub-unit (telephone 18) acquires the address of the main unit (personal computer 17).

In step 22, the newly entering sub-unit (telephone 18) transmits an authentication request frame to the main unit (personal computer 17). By receiving the authentication request frame, the main unit (personal computer 17) acquires the address of the newly entering sub-unit (telephone 18) and so forth. By this means, the information stored in beacon information 49 is updated.

In step 23, the main unit (personal computer 17) transmits an authentication response frame to the newly entering sub-unit (telephone 18). By this means, the newly entering sub-unit (telephone 18) enters the network.

In step 24, step 25, and step 26, the main unit (personal computer 17) transmits a 6 V signal voltage beacon to the sub-units (television receiver 19 and telephone 18) in the network.

By means of the above, network-internal voltage information can be shared, enabling communication within the network to be stabilized.

Embodiment 5

Embodiment 5 will now be described with reference to FIG. 12A and FIG. 12B. Here, members having the same configuration or function as in Embodiments 1 through 4 are assigned the same reference codes as in Embodiments 1 through 4, and detailed descriptions thereof are omitted.

In this embodiment, personal computer 17, telephone 18, and television receiver 19 form a network. Telephone 18 is the main unit, and personal computer 17 and television receiver 19 are sub-units.

In this embodiment, communication between the sub-units (personal computer 17 and television receiver 19) is described. FIG. 12A is a drawing that applies to a case in which television receiver 19 is the transmitting side and personal computer 17 is the receiving side, and FIG. 12B is a drawing that applies to a case in which personal computer 17 is the transmitting side and television receiver 19 is the receiving side.

Main unit (telephone 18) reports the minimum drive voltage to each sub-unit by means of a beacon as described above. However, when communication has not been performed even once between television receiver 19 and personal computer 17, television receiver 19 and personal computer 17 do not have each other's detailed information (address, drive voltage, and so forth, for example).

Figure 12A:
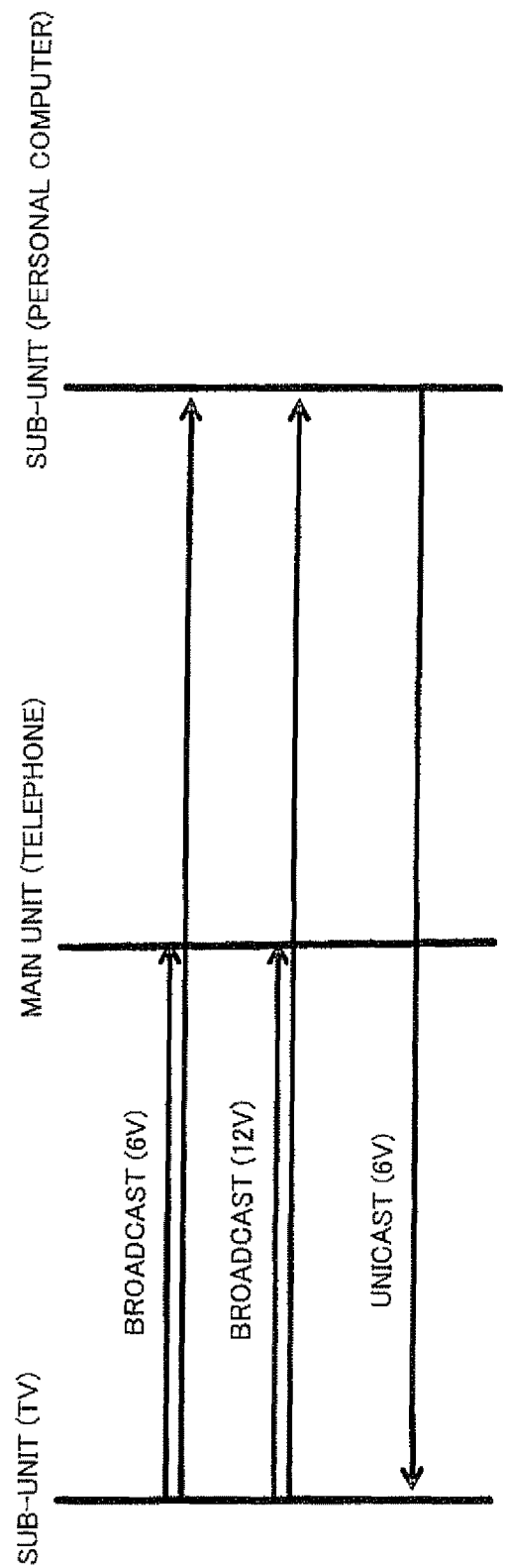
FIG. 12A is a flowchart showing an example of a method of communication between sub-devices according to Embodiment 5.

Thus, in the case illustrated in FIG. 12A, television receiver 19 performs broadcast transmission within the network of a frame that includes information with personal computer 17 as a target for a response. At this time, television receiver 19 holds information on the drive voltage of the main unit (telephone 18) and the minimum drive voltage in the network (DC 6 V) from a beacon transmitted from telephone 18 which is the main unit, but does not hold information on the drive voltage of the party (personal computer 17) to which television receiver 19 wishes to transmit. Consequently, television receiver 19 performs broadcast transmission of a 6 V signal voltage frame and a 12 V signal voltage frame.

Television receiver 19 transmits with the minimum drive voltage in the network as a signal voltage so that all the sub-units in the network are able to receive. Television receiver 19 also transmits at a 12 V signal voltage for a time when the drive voltage of the party to which television receiver 19 wishes to transmit is 12 V or above.

By receiving the above-described frame, personal computer 17 recognizes that it is a sub-unit targeted for a response, and also acquires television receiver 19 address and drive voltage information. Thus, personal computer 17 performs unicast transmission to television receiver 19 of personal computer 17's own address and drive voltage information. That is to say, personal computer 17 transmits this frame specifically to television receiver 19.

By means of the above, television receiver 19 can acquire information on the address and drive voltage of the party (personal computer 17) to which television receiver 19 wishes to transmit, and can implement stable communication with personal computer 17.

Figure 12B:
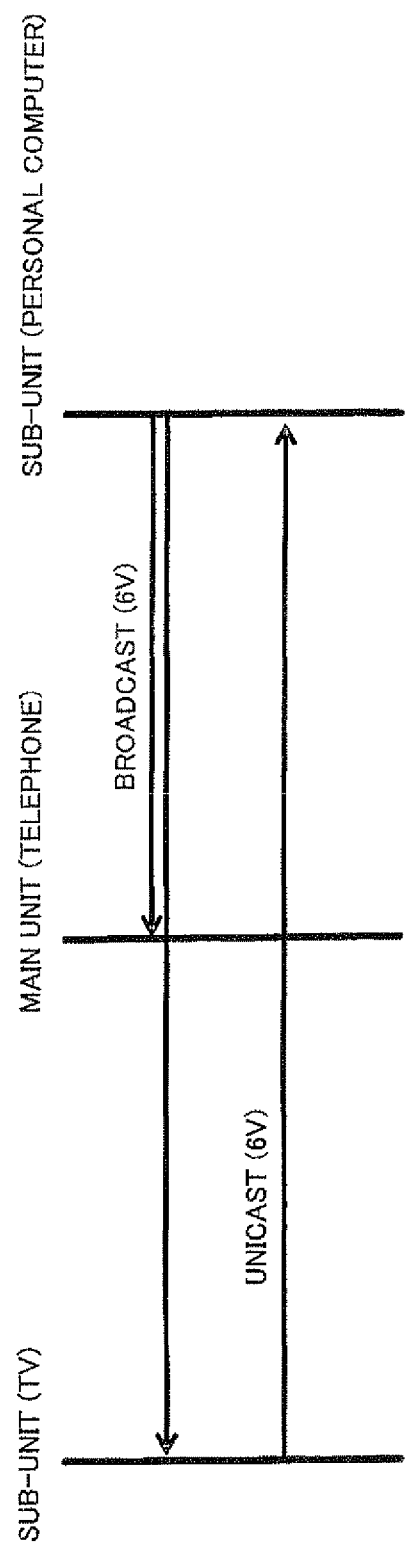
FIG. 12B is a flowchart showing an example of a method of communication between sub-devices according to Embodiment 5.

On the other hand, in the case illustrated in FIG. 12B, since the drive voltage of personal computer 17 is DC 6 V, personal computer 17 transmits a frame that includes information with television receiver 19 as a target for a response at a 6 V signal voltage. By receiving this frame, television receiver 19 recognizes that it is a target for a response, and also acquires personal computer 17 address and drive voltage information. Television receiver 19 then transmits a frame that includes its own address and drive voltage information to personal computer 17.

By means of the above, personal computer 17 can acquire information on the address and drive voltage of the party (television receiver 19) to which personal computer 17 wishes to transmit, and can implement stable communication with television receiver 19.

Network-internal detailed information may also be stored in a beacon transmitted from the main unit (telephone t 8). That is to say, address and drive voltage information for sub-units in the network may be stored in a beacon. By this means, a sub-unit can ascertain address and drive voltage information for each electronic device in the network. Thus, even when communication is performed between sub-units for the first time, since they know each other's address and drive voltage information they can start stable communication smoothly without performing operations such as described in this embodiment.

In this embodiment, communication section 26 of each electronic device manages voltage information, but a management apparatus or the like may also be provided in user-specific voltage changing apparatus 9. This management apparatus can stabilize communication within the network by managing network-internal voltage information. For example, when telephone 18 wishes to transmit a signal to personal computer 17, telephone 18 notifies the above management apparatus that it will transmit a signal to personal computer 17. The management apparatus reports drive voltage information of personal computer 17 to telephone 18, and telephone 18 controls the signal voltage based on this drive voltage information. Thus, providing a management apparatus enables network-internal voltage information to be managed collectively.

Embodiments 1 through 5 can be implemented individually, or can be freely combined.

Above Embodiments 1 through 5 relate to a direct current power line communication apparatus that transmits a signal using a direct current voltage line, and that is provided with: a transmission section that is connected to the direct current voltage line and transmits a signal to the direct current voltage line; a control section that is connected to the transmission section and controls the transmission section; and a voltage detection section that is connected to the control section and the direct current voltage line, detects a voltage of the direct current voltage line, and reports the detected voltage to the control section; wherein the control section transmits information including information on the voltage to another direct current power line communication apparatus via the transmission section.

According to this, a direct current power line communication apparatus can report a direct current voltage line voltage to another direct current power line communication apparatus. That is to say, a direct current power line communication apparatus can report information on a voltage with which it is supplied to another direct current power line communication apparatus. By this means, the other direct current power line communication apparatus can transmit a signal to the direct current power line communication apparatus using a signal size based on this drive voltage. Consequently, communication between direct current power line communication apparatus via a direct current voltage line can be stabilized.

Above Embodiments 1 through 5 relate to a direct current power line communication apparatus wherein: the voltage detection section is provided with a first resistor and a second resistor that are connected in series between the direct current voltage line and ground, and an A/D converter that detects a voltage applied to one of the first resistor and second resistor and ground; and the A/D converter converts the detected voltage to a voltage of the direct current voltage line, and reports this voltage to the control section.

According to this, a first resistor and second resistor divide a voltage supplied from a direct current voltage line, and an A/D converter detects a divided voltage, and furthermore converts this voltage to a voltage of a direct current voltage line and reports this voltage to a control section. By this means, the control section can acquire information on a direct current voltage line voltage (a voltage supplied to itself). Furthermore, since a voltage supplied from a direct current voltage line is divided by the first resistor and second resistor, a voltage actually detected by the A/D converter is smaller than the voltage supplied from the direct current voltage line. Therefore, the detectable upper limit of the A/D converter can be raised.

Above Embodiments 1 through 5 relate to a direct current power line communication apparatus wherein: the voltage detection section is provided with a first resistor and a second resistor that are connected in series between the direct current voltage line and ground, and an A/D converter that detects a voltage applied to one of the first resistor and second resistor and ground, and reports the detected voltage to the control section; and the control section converts the voltage to a voltage of the direct current voltage line.

According to this, a first resistor and second resistor divide a voltage supplied from a direct current voltage line, and an A/D converter detects a divided voltage, and furthermore reports this voltage to a control section. Then the control section converts this reported voltage to a voltage of the direct current voltage line. By this means, the control section can acquire information on a direct current voltage line voltage (a voltage supplied to itself). Furthermore, since a voltage supplied from a direct current voltage line is divided by the first resistor and second resistor, a voltage actually detected by the A/D converter is smaller than the voltage supplied from the direct current voltage line. Therefore, the detectable upper limit of the A/D converter can be raised.

Above Embodiments 1 through 5 relate to a direct current power line communication apparatus that is provided with a transmission output control section that is supplied with a direct current voltage via the predetermined direct current voltage line converted by the direct current-direct current conversion section, and that is connected to the transmission section, and that controls a signal voltage of a signal transmitted by the control section.

According to this, a direct current power line communication apparatus can control the signal voltage of a signal by being provided with a transmission output control section. That is to say, the amplitude of a signal can be changed.

Above Embodiments 1 through 5 relate to a direct current power line communication apparatus wherein: the transmission output control section is provided with a power feed control section to which a direct current voltage is supplied via the direct current voltage line, and a supply voltage generation section that is connected to the power feed control section and the transmission section; the power feed control section intermittently supplies the supplied direct current voltage to the supply voltage generation section; and the supply voltage generation section supplies direct current voltage per unit time of the intermittently supplied direct current voltage to the transmission section.

According to this, a direct current voltage supplied to the transmission section can be controlled. Having a direct current voltage supplied to the transmission section controlled enables the signal voltage of a signal to be controlled.

Above Embodiments 1 through 5 relate to a direct current power line communication system that is provided with: a voltage changing apparatus that outputs a supplied voltage to a first output terminal at a first direct current voltage, and outputs the supplied voltage to a second output terminal at a second direct-current voltage; a first direct current voltage line that is connected to the first output terminal; a second direct current voltage line that is connected to the second output terminal; a first direct current power line communication apparatus that is connected to the first direct current voltage line, and that detects a voltage of the first direct current voltage line and holds information on a first direct current voltage detected here; and a second direct current power line communication apparatus that is connected to the second direct current voltage line, and that detects a voltage of the second direct current voltage line and holds information on a second direct current voltage detected here; wherein the first direct current power line communication apparatus transmits a signal that includes information on the first direct current voltage to the second direct current power line communication apparatus.

According to this, a second direct current power line communication apparatus can acquire information on a first direct current voltage. By this means, the second direct current power line communication apparatus can transmit a signal to the first direct current power line communication apparatus at a signal voltage based on information on the first direct current voltage. Therefore, communication in a direct current power line communication system can be stabilized.

Above Embodiments 1 through 5 relate to a direct current power line communication system wherein the second direct current power line communication apparatus transmits a signal at a signal voltage based on information on the first direct current voltage.

According to this, the possibility of a first direct current power line communication apparatus receiving a signal can be increased. Therefore, communication in a direct current power line communication system can be stabilized.

Above Embodiments 1 through 5 relate to a direct current power line communication system wherein the second direct current power line communication apparatus transmits a signal at a signal voltage less than or equal to a predetermined reference voltage if the first direct current voltage is larger than the predetermined reference voltage.

Above Embodiments 1 through 5 relate to a direct current power line communication system wherein the second direct current power line communication apparatus transmits a signal at a signal voltage less than or equal to the first direct current voltage if the first direct current voltage is smaller than a predetermined reference voltage.

According to these, a second direct current power line communication apparatus decides a signal voltage by means of a comparison with a reference voltage. Consequently, controlling a signal voltage according to a transmission destination more than necessary can be suppressed. By this means, signal processing by the second direct current power line communication apparatus can be simplified.

Above Embodiments 1 through 5 relate to a direct current power line communication system wherein the predetermined reference voltage is the maximum signal voltage of a signal of the second direct current power line communication apparatus.

According to this, a second direct current power line communication apparatus transmits a signal at the maximum signal voltage to a receiving side that is supplied with a voltage greater than or equal to the maximum signal voltage. Thus, the possibility of the receiving side receiving a signal can be increased. Therefore, communication in a direct current power line communication system can be stabilized.

Above Embodiments 1 through 5 relate to a direct current power line communication system wherein the first direct current power line communication apparatus transmits to the second direct current power line communication apparatus a signal that includes information on the smallest minimum voltage among voltages supplied to a direct current power line communication apparatus connected to the voltage changing apparatus.

According to this, a second direct current power line communication apparatus can ascertain the smallest voltage among voltages supplied to a direct current power line communication apparatus connected to a voltage changing apparatus. By this means, the second direct current power line communication apparatus can cause a transmission destination to receive a signal by making the signal voltage the minimum voltage without holding transmission destination voltage information. Therefore, communication in a direct current power line communication system can be stabilized.

Above Embodiments 1 through 5 relate to a direct current power line communication system wherein the first direct current power line communication apparatus periodically transmits a signal that includes information on the minimum voltage to the second direct current power line communication apparatus.

According to this, a second direct current power line communication apparatus can ascertain information on the minimum voltage even if this is updated. Therefore, communication in a direct current power line communication system can be stabilized.

Above Embodiments 1 through 5 relate to a direct current power line communication system wherein: the voltage changing apparatus further has a third output terminal that outputs at the third direct current voltage; the direct current power line communication system further has a third direct current voltage line that is connected to the third output terminal, and a third direct current power line communication apparatus that is connected to the third direct current voltage line and that detects a voltage of the third direct current voltage line and holds information on a third direct current voltage detected here; and the first direct current power line communication apparatus reports information on the minimum voltage to at least the third direct current power line communication apparatus.

According to this, reporting can be performed to a third direct current power line communication apparatus newly connected to a voltage changing apparatus. That is to say, a third direct current power line communication apparatus newly connected to a voltage changing apparatus can also hold minimum voltage information in the same way as a first direct current power line communication apparatus and second direct current power line communication apparatus. Therefore, communication in a direct current power line communication system can be stabilized.

Above Embodiments 1 through 5 relate to a direct current power line communication system wherein: the voltage changing apparatus outputs the second direct current voltage that is higher than the first direct current voltage to the second output terminal, and also outputs the third direct current voltage that is higher than the second direct current voltage to the third output terminal; the first direct current power line communication apparatus makes a signal voltage of a signal the first direct current voltage; and the second direct current power line communication apparatus and the third direct current power line communication apparatus make a signal voltage of a signal the second direct current voltage.

According to this, a configuration that makes a signal voltage of a signal the second direct current voltage can be used even in a third direct current power line communication apparatus that is driven at a third direct current voltage that is higher than a second direct current voltage. Consequently, communication in a direct current power line communication system can be stabilized even if a plurality of direct current power line communication apparatus or suchlike electronic devices of the third output terminal are connected, and the third direct current voltage falls as a result.

Above Embodiments 1 through 5 relate to a direct current power line communication system wherein the third direct current power line communication apparatus reports information on the third direct current voltage to the first direct current power line communication apparatus in the event of receiving information on the minimum voltage.

According to this, the first direct current power line communication apparatus can acquire third direct current voltage information. By this means, the first direct current power line communication apparatus can determine whether or not minimum voltage information is to be updated.

Above Embodiments 1 through 5 relate to a direct current power line communication system wherein the third direct current power line communication apparatus transmits a signal that includes information on the third direct current voltage to at least the first direct current power line communication apparatus in the event of being unable to receive information on the minimum voltage within a predetermined time.

According to this, the first direct current power line communication apparatus can acquire third direct current voltage information. By this means, the first direct current power line communication apparatus can determine whether or not minimum voltage information is to be updated.

Above Embodiments 1 through 5 relate to a direct current power line communication system wherein the first direct current power line communication apparatus transmits a signal that includes information on the lower voltage of information on the minimum voltage and information on the third direct current voltage to the second direct current power line communication apparatus and the third direct current power line communication apparatus.

According to this, updated minimum voltage information can be reported to a second direct current power line communication apparatus and third direct current power line communication apparatus. By this means, updated minimum voltage information can be shared by the first through third direct current power line communication apparatus. The first direct current power line communication apparatus can acquire third direct current voltage information.

Above Embodiments 1 through 5 relate to a direct current power line communication system wherein the first direct current power line communication apparatus transmits a signal that includes information on the minimum voltage to the second direct current power line communication apparatus and the third direct current power line communication apparatus at a signal voltage of the minimum voltage, and also transmits a signal that includes information on the minimum voltage to the second direct current power line communication apparatus and the third direct current power line communication apparatus at a signal voltage of a voltage larger than the minimum voltage.

According to this, minimum voltage information can be reported more dependably to a second direct current power line communication apparatus and third direct current power line communication apparatus.

Above Embodiments 1 through 5 relate to a direct current power line communication system wherein the first direct current power line communication apparatus transmits to the second direct current power line communication apparatus and the third direct current power line communication apparatus more signals that include information on the minimum voltage transmitted at a signal voltage of the minimum voltage than signals that include information on the minimum voltage transmitted at a signal voltage of a voltage larger than the minimum voltage.

According to this, minimum voltage information can be reported more dependably to a second direct current power line communication apparatus and third direct current power line communication apparatus.

Above Embodiments 1 through 5 relate to a direct current power line communication system wherein the first direct current power line communication apparatus transmits to the second direct current power line communication apparatus and the third direct current power line communication apparatus a signal that includes second direct current voltage information, third direct current voltage information, and addresses of the second direct current power line communication apparatus and the third direct current power line communication apparatus.

According to this, communication between a second direct current power line communication apparatus and third direct current power line communication apparatus can be performed smoothly.

Above Embodiments 1 through 5 relate to a direct current power line communication system that has an impedance element connected between the first output terminal and the second output terminal.

According to this, a signal can be bypassed between a first direct current voltage line and second direct current voltage line by means of an impedance element.

Above Embodiments 1 through 5 relate to a direct current power line communication system that has a direct current generation section that is connected to the voltage changing apparatus, and supplies a direct current voltage to the voltage changing apparatus.

Above Embodiments 1 through 5 relate to a direct current power line communication system that has: a voltage supply section that is connected to the voltage changing apparatus, and supplies a direct current voltage to the voltage changing apparatus; and a direct current storage section that is connected between the voltage supply section and the voltage changing apparatus, and stores a direct current voltage supplied by the voltage supply section.

Above Embodiments 1 through 5 relate to a power line communication apparatus that transmits a signal using a power line, and that is provided with: a transmission section that is connected to the power line, and transmits a signal to the power line; a control section that is connected to the transmission section, and controls the transmission section; and an indicator detection section that is connected to the control section and the power line, and detects an indicator of the power line and reports the detected indicator to the control section; wherein the control section transmits a signal that includes information on the indicator to another power line communication apparatus via the transmission section.

According to this, a power line communication apparatus can report a power line voltage to another power line communication apparatus. That is to say, a power line communication apparatus can report information on a voltage with which it is supplied to another direct current power line communication apparatus. By this means, the other power line communication apparatus can transmit a signal to the power line communication apparatus using a signal size based on this drive voltage. Consequently, communication between power line communication apparatus via a power line can be stabilized.

Above Embodiments 1 through 5 relate to a direct current power line communication apparatus that transmits a signal based on information on a drive voltage of another communication device using a direct current voltage line, and that has a configuration including: a transmission section that is connected to the direct current voltage line and transmits a signal to the direct current voltage line; and a control section that is connected to the transmission section and controls a signal voltage of a signal transmitted by the transmission section based on information on a drive voltage of the other communication device.

According to this, a direct current power line communication apparatus transmits a signal based on information on the drive voltage of another communication device. Therefore, communication in a direct current power line communication system can be stabilized.

Above Embodiments 1 through 5 relate to a direct current power line communication apparatus having a configuration provided with: a direct current-direct current conversion section that is connected to the direct current voltage line and converts a voltage of the direct current voltage line to a predetermined direct current voltage; a power feed control section to which a direct current voltage is supplied via the direct current voltage line; and a supply voltage generation section that is connected to the power feed control section and the transmission section; wherein the power feed control section intermittently supplies the supplied direct current voltage to the supply voltage generation section based on information on a drive voltage of the other communication device, and the supply voltage generation section supplies a per unit time direct current voltage of the intermittently supplied predetermined direct current voltage to the transmission section.

According to this, a direct current voltage supplied to the transmission section can be controlled based on information on the drive voltage of another communication device. Having a direct current voltage supplied to the transmission section controlled enables the signal voltage of a signal to be controlled. Therefore, communication in a direct current power line communication system can be stabilized.

The disclosures of Japanese Patent Application No. 2009-226947, filed on Sep. 30, 2009, Japanese Patent Application No. 2009-226948, filed on Sep. 30, 2009, and Japanese Patent Application No. 2009-226949, filed on Sep. 30, 2009, including the specifications, drawings and abstracts, are incorporated herein by reference in their entirety.

INDUSTRIAL APPLICABILITY

The present invention is suitable for use in a direct current power line communication apparatus that is connected to a direct current voltage line.

REFERENCE SIGNS LIST

1 Pole-mounted transformer
2 Individual user premises (home, factory, store, or the like)
3 Alternating current-direct current conversion section (AC/DC)
4 Direct current voltage line
5 Direct current voltage line
6 Power outlet
7 Electronic device
8 Direct current voltage line
9 User-specific voltage changing apparatus
9a Direct current input terminal
9b Voltage changing circuit
9c, 9d, 9e, 9f Direct current output terminal
10 Direct current generation section
11 Direct current storage section
12 Diode
13, 14, 15, 16 Power outlet
13a, 14a, 15a, 16a Direct current voltage line
17 Personal computer (PC)
18 Telephone
19 Television receiver (TV)
20 DVD recorder
21 Air conditioner
22, 23, 24 Capacitor
25 Power supply section
26 Communication section
27 Transmission section
28 Reception section
29 PLC communication control section
30 Voltage detection section
31, 48 Frame
32, 33, 34, 35, 36, 37, 38, 39, 40, 49 Information
41, 42 Resistor
43 A/D converter
44 DSP
45 Switching circuit
46 Smoothing circuit
47 A/D converter
50 Transmission output control section
211 CPU
212 PLC•MAC block
213 PLC•PHY block
220 AFE•IC
221 D/A converter
222 A/D converter
251 Low-pass filter
252 Driver IC
240 Memory
260 Band-pass filter
270 Coupler
300 Direct current-direct current conversion section (DC/DC)

The invention claimed is:

1. A first direct current power line communication apparatus, to which a first direct current voltage is supplied via a first direct current voltage line, the first direct current power line communication apparatus being configured to transmit a first signal to a second direct current power line communication apparatus, to which a second direct current voltage different from the first direct current voltage is supplied via a second direct current voltage line, the first direct current power line communication apparatus comprising:
 a transmitter that is connected to the first direct current voltage line and that, in operation, transmits the first signal to the second direct current power line communication apparatus via the first direct current voltage line and the second direct current voltage line; and
 a controller that is connected to the transmitter and that, in operation, controls the transmitter;
 wherein the transmitter transmits a value related to the first direct current voltage, the value being included in the first signal, via the first direct current power line and the second direct current power line to the second direct current power line communication apparatus, and
 wherein the first direct current voltage line is connected to the second direct current voltage line by a bypass circuit that transmits the first signal.

2. The first direct current power line communication apparatus according to claim 1, further comprising:
 a receiver that, in operation, receives a second signal that includes a value related to the second direct current voltage from the second direct current power line communication apparatus; and
 a transmission output controller that, in operation, controls a signal voltage of the first signal by controlling a direct current voltage supplied to the transmitter based on the value related to the second direct current voltage.

3. The first direct current power line communication apparatus according to claim 2, wherein:
 the transmission output controller comprises:
 a power feed controller to which a direct current voltage is supplied via the first direct current voltage line; and
 a supply voltage generator that is connected to the power feed controller and the transmitter; wherein
 the power feed controller, in operation, intermittently supplies the direct current voltage to the supply voltage generator; and
 the supply voltage generator, in operation, supplies a per unit time of the intermittently supplied direct current voltage to the transmitter.

4. The first direct current power line communication apparatus according to claim 1, further comprising:
 a voltage detector that is connected to the controller and the first direct current voltage line, and that, in operation, detects the first direct current voltage and reports the first direct current voltage to the controller.

5. The first direct current power line communication apparatus according to claim 1, wherein the controller transmits the first signal including the value related to the first direct current voltage to the second direct current power line communication apparatus via the transmitter while the first direct current voltage is supplied to the first direct current power line communication apparatus through the first direct current voltage line and the second direct current voltage is supplied to the second direct current power line communication apparatus through the second direct current voltage line.

6. A direct current power line communication system comprising:
 a first output terminal that outputs a first direct current voltage;
 a second output terminal that outputs a second direct current voltage of a different value from the first direct current voltage;
 a first direct current voltage line that is connected to the first output terminal, and to which the first direct current voltage is supplied;
 a second direct current voltage line that is connected to the second output terminal, and to which the second direct current voltage is supplied;
 a first direct current power line communication apparatus that is connected to the first direct current voltage line; and a second direct current power line communication apparatus that is connected to the second direct current voltage line, wherein the first direct current power line communication apparatus transmits a first signal that includes a value related to the first direct current voltage to the second direct current power line communication apparatus via the first direct current voltage line and the second direct current voltage line, and wherein the first direct current voltage line is connected to the second direct current voltage line by a bypass circuit that transmits the first signal.

7. The direct current power line communication system according to claim 6, wherein the second direct current power line communication apparatus transmits a second signal at a signal voltage that is controlled based on the value related to the first direct current voltage.

8. The direct current power line communication system according to claim 7, wherein the second direct current power line communication apparatus transmits the second signal at a signal voltage less than or equal to a predetermined reference voltage if the first direct current voltage is larger than the predetermined reference voltage.

9. The direct current power line communication system according to claim 7, wherein the second direct current power line communication apparatus transmits the second signal at a signal voltage less than or equal to the first direct current voltage if the first direct current voltage is smaller than a predetermined reference voltage.

10. The direct current power line communication system according to claim 9, wherein the predetermined reference voltage is a maximum signal voltage of a signal of the second direct current power line communication apparatus.

11. The direct current power line communication system according to claim 6, further comprising a voltage changing apparatus that has a plurality of output terminals including the first output terminal and the second output terminal, wherein the first direct current power line communication apparatus transmits to the second direct current power line communication apparatus a signal that includes information regarding a minimum voltage among voltages supplied to plural direct current power line communication apparatuses connected to the voltage changing apparatus.

12. The direct current power line communication system according to claim 11, wherein the first direct current power line communication apparatus periodically transmits the signal that includes information regarding the minimum voltage to the second direct current power line communication apparatus.

13. The direct current power line communication system according to claim 12, wherein:

the voltage changing apparatus has a third output terminal that outputs at a third direct current voltage;

the direct current power line communication system has:
a third direct current voltage line that is connected to the third output terminal, and to which the third direct current voltage is supplied; and
a third direct current power line communication apparatus that is connected to the third direct current voltage line; and the first direct current power line communication apparatus transmits the signal that includes information regarding the minimum voltage to at least the third direct current power line communication apparatus.

14. The direct current power line communication system according to claim 13, wherein:

the voltage changing apparatus outputs the second direct current voltage that is higher than the first direct current voltage to the second output terminal, and also outputs the third direct current voltage that is higher than the second direct current voltage to the third output terminal;

the first direct current power line communication apparatus sets the first direct current voltage as a signal voltage of a signal; and the second direct current power line communication apparatus and the third direct current power line communication apparatus set the second direct current voltage as a signal voltage of a signal.

15. The direct current power line communication system according to claim 13, wherein the third direct current power line communication apparatus transmits a third signal that includes a value related to the third direct current voltage to the first direct current power line communication apparatus in the event of receiving the signal that includes information regarding the minimum voltage.

16. The direct current power line communication system according to claim 13, wherein the third direct current power line communication apparatus transmits a third signal that includes a value related to the third direct current voltage to at least the first direct current power line communication apparatus in the event of being unable to receive information regarding the minimum voltage within a predetermined time.

17. The direct current power line communication system according to claim 15, wherein the first direct current power line communication apparatus transmits a signal that indicates which is lower between the minimum voltage and the third direct current voltage to the second direct current power line communication apparatus and the third direct current power line communication apparatus.

18. The direct current power line communication system according to claim 16, wherein the first direct current power line communication apparatus transmits a signal that indicates which is lower between the minimum voltage and the third direct current voltage to the second direct current power line communication apparatus and the third direct current power line communication apparatus.

19. The direct current power line communication system according to claim 13, wherein the first direct current power line communication apparatus transmits the signal that includes information regarding the minimum voltage to the second direct current power line communication apparatus and the third direct current power line communication apparatus at a signal voltage of the minimum voltage, and also transmits the signal that includes information regarding the minimum voltage to the second direct current power line communication apparatus and the third direct current power line communication apparatus at a signal voltage of a voltage larger than the minimum voltage.

20. The direct current power line communication system according to claim 19, wherein the first direct current power line communication apparatus transmits to the second direct current power line communication apparatus and the third direct current power line communication apparatus more signals that include information regarding the minimum voltage at a signal voltage of the minimum voltage, than signals that include information regarding the minimum voltage at a signal voltage of a voltage larger than the minimum voltage.

21. The direct current power line communication system according to claim 6, wherein:
the first direct current power line communication apparatus detects the first direct current voltage, and
the second direct current power line communication apparatus detects the second current voltage.

22. A first direct current power line communication apparatus, to which a first direct current voltage is supplied via a first direct current voltage line, the first direct current power line communication apparatus being configured to transmit a first signal to a second direct current power line communication apparatus, to which a second direct current voltage different from the first direct current voltage is supplied via a second direct current voltage line, the first direct current power line communication apparatus comprising:
a transmitter that is connected to the first direct current voltage line and that, in operation, transmits the first signal to the second direct current power line communication apparatus via the first direct current voltage line and the second direct current voltage line;
a receiver that, in operation, receives a second signal that includes a value related to the second direct current voltage from the second direct current power line communication apparatus via the first direct current voltage line and the second direct current voltage line; and
a controller that, in operation, controls a signal voltage of the first signal transmitted by the transmitter based on the value related to the second direct current voltage,
wherein the first direct current voltage line is connected to the second direct current voltage line by a bypass circuit that communicates the first signal and the second signal.

23. The first direct current power line communication apparatus according to claim 22, further comprising a transmission output controller that, in operation, controls a signal voltage of the first signal by controlling a direct current voltage supplied to the transmitter based on the value related to the second direct current voltage.

24. The first direct current power line communication apparatus according to claim 22, further comprising:
a voltage detector that is connected to the controller and the first direct current voltage line, and that, in operation, detects the first direct current voltage and reports the first direct current voltage to the controller.

* * * * *